US011282312B2

(12) United States Patent
Determann et al.

(10) Patent No.: US 11,282,312 B2
(45) Date of Patent: *Mar. 22, 2022

(54) SYSTEM AND METHOD FOR PAIRING A KEY WITH A VEHICLE VIA A VEHICLE COMMUNICATIONS PORT BY A DONGLE

(71) Applicant: iKeyless, LLC, Louisville, KY (US)

(72) Inventors: Jon Determann, Louisville, KY (US); Douglas Lawrence Robertson, Crestwood, KY (US); Adam Lee Pizer, Louisville, KY (US); Daniel Charles Johnson, Crestwood, KY (US); David Golman King, Shelbyville, KY (US)

(73) Assignee: iKeyless, LLC, Louisville, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/947,892

(22) Filed: Aug. 23, 2020

(65) Prior Publication Data

US 2021/0035390 A1    Feb. 4, 2021

Related U.S. Application Data

(63) Continuation-in-part of application No. 16/453,862, filed on Jun. 26, 2019, now Pat. No. 10,755,506.

(60) Provisional application No. 62/822,536, filed on Mar. 22, 2019, provisional application No. 62/703,669, filed on Jul. 26, 2018, provisional application No. 62/690,326, filed on Jun. 26, 2018.

(51) Int. Cl.
*G07C 9/00* (2020.01)
*H04W 12/00* (2021.01)
*H04W 4/40* (2018.01)
*B60R 25/24* (2013.01)
*H04W 12/50* (2021.01)
*H04W 12/71* (2021.01)

(52) U.S. Cl.
CPC ..... *G07C 9/00309* (2013.01); *G07C 9/00857* (2013.01); *H04W 12/50* (2021.01); *G07C 2009/00873* (2013.01); *H04W 12/71* (2021.01)

(58) Field of Classification Search
CPC .......... G07C 9/00309; G07C 9/00857; G07C 2009/00873; G07C 2009/00769; G07C 5/008; H04W 12/50; H04W 12/71; H04W 4/40; G08C 2201/20; G08C 2201/21
USPC ..................... 340/5.72, 5.24, 5.23
See application file for complete search history.

(56) References Cited

U.S. PATENT DOCUMENTS

| | | | | |
|---|---|---|---|---|
| 5,864,297 A * | 1/1999 | Sollestre | ............ | G07C 9/00817 340/5.23 |
| 6,501,369 B1 * | 12/2002 | Treharne | ................. | B60R 25/24 307/10.5 |
| 6,512,461 B1 * | 1/2003 | Benzie | .................... | B60R 25/04 340/5.23 |
| 10,755,506 B2 * | 8/2020 | Determann | ............. | H04W 4/40 |

(Continued)

*Primary Examiner* — Edwin C Holloway, III
(74) *Attorney, Agent, or Firm* — Duncan Galloway Greenwald PLLC; Kevin T. Duncan

(57) ABSTRACT

The present invention provides a system, method, and apparatus for pairing a vehicle key or remote keyless entry device with a vehicle by a dongle connected to an OBD port of the vehicle. The OBD programming dongle operates without a connection to an external device and pairs one or more keys with a vehicle without user intervention after the pairing process has started. The OBD programming dongle may be linked to a specific vehicle by the VIN code of the specific vehicle.

22 Claims, 16 Drawing Sheets

(56) References Cited

U.S. PATENT DOCUMENTS

| | | | |
|---|---|---|---|
| 2005/0267655 A1* | 12/2005 | Gessner | B60R 16/0231 |
| | | | 701/29.1 |
| 2007/0143828 A1* | 6/2007 | Jeal | H04L 63/0853 |
| | | | 726/4 |
| 2009/0278656 A1* | 11/2009 | Lopez | G07C 9/27 |
| | | | 340/5.72 |
| 2011/0032075 A1* | 2/2011 | Alrabady | H04L 12/12 |
| | | | 340/5.72 |
| 2016/0180622 A1* | 6/2016 | Ramchandani | G08C 17/02 |
| | | | 340/12.28 |

* cited by examiner

SYSTEM AND METHOD FOR PAIRING A KEY WITH A VEHICLE VIA A VEHICLE COMMUNICATIONS PORT BY A DONGLE

CROSS-REFERENCE AND CLAIM OF PRIORITY

The present invention is a continuation-in-part of U.S. patent application Ser. No. 16/453,862, entitled SYSTEM AND METHOD FOR PAIRING A KEY WITH A VEHICLE VIA A VEHICLE COMMUNICATIONS PORT BY A DONGLE, filed Jun. 26, 2019; which claims the benefit of priority to U.S. Provisional Pat. App. 62/690,326, filed Jun. 26, 2018, entitled SYSTEM AND METHOD FOR PAIRING A KEY WITH A VEHICLE VIA A VEHICLE COMMUNICATIONS PORT BY A DONGLE; to U.S. Provisional Pat. App. 62/703,669, filed Jul. 26, 2018, entitled SYSTEM AND METHOD FOR PAIRING A KEY WITH A VEHICLE VIA A VEHICLE COMMUNICATIONS PORT BY A DONGLE; and to U.S. Provisional Pat. App. 62/822,536, filed Mar. 22, 2019, entitled SYSTEM AND METHOD FOR PAIRING A KEY WITH A VEHICLE VIA A VEHICLE COMMUNICATIONS PORT BY A DONGLE; each of which are incorporated by reference herein in their entirety.

FIELD OF INVENTION

The present invention generally relates to the field of pairing keys with vehicles. More specifically, the present invention relates to the pairing and unpairing of keys to vehicles via a vehicle communications port by a dongle device.

BACKGROUND OF THE INVENTION

Remote Access systems for consumer vehicles have become a popular, if not essential, feature of most vehicles sold today. Nearly every vehicle on the market for the past several years has included some form of keyless entry as either a standard feature or add-on option. Consumers with older vehicles without remote access systems have been able to retrofit their vehicles with aftermarket systems.

The technologies behind these systems have evolved rapidly with remote systems moving from low security fixed codes with simple transmission schemes to high security encrypted rolling codes with advanced transmission protocols. Developers of these systems, both original equipment manufacturer ("OEM") and aftermarket, have been constantly refining and improving their offerings to take advantage of improvements in technology. Over time, the numerous designs and platforms, coupled with rapidly changing security technologies, have resulted in a great variety of remote devices and systems that are almost universally incompatible across vehicle brands or makes and even between different year and models of vehicles.

Contemporary remote keyless entry ("RKE") systems are designed to be easy to use and secure from attackers. When a user presses a button on his or her keyless remote, or "RKE device", an internal microprocessor interprets the request and generates a unique packet of binary data. This packet may contain a unique serial number of the remote, an authentication string, function code, and various checksums. This data packet is then transmitted by the remote via an ultra-high frequency (UHF) radio signal to the vehicle. The user's vehicle can then process the data verifying the remote is authorized and perform the requested action (ex: unlocking a door).

The transmitted radio signal could be monitored by possible attackers, so the authentication string is important in maintaining the security of the vehicle. The authentication string often changes with each button press in what is known as a "rolling code". This rolling code prevents an attacker from simply copying and replaying an earlier transmission from the same remote. To prevent an attacker from gathering many samples of the rolling code for analysis, the rolling code is often encrypted with a cipher which completely scrambles the authentication value. In order to process these complex and constantly changing values, the vehicles must share the encryption key used by the remote, the algorithm used to generate the rolling code, and the method for synchronizing to the rolling code.

Additionally, starting in the early 1990s, cars began incorporating "immobilizer systems" that utilized security transponder technology. Transponders are small self-contained, or "discrete", plastic or glass inserts that are typically embedded into the head of a key, forming a "transponder key", and which supplement the security of a cut key blade alone. Transponders include an embedded microprocessor and loop of wire, or "transponder coil", and require no battery as they are powered by mutual inductive coupling of a low frequency radio signal, or "LF Field", delivered from the vehicle's "LF Coil", a loop of wire around the vehicle's ignition cylinder. When a driver starts his or her car, the key blade activates the ignition and the car simultaneously "reads" the transponder via the LF Coil to verify the key is authorized to start the car. If the transponder does not "respond" with a valid code (e.g., in the case of hot-wiring a car), the car will become immobilized, resulting in the car either not starting at all or shutting itself off a few seconds after starting.

Security transponder evolution has mirrored that of RKE systems with the first generation being simple, insecure devices that transmitted a fixed value when interrogated by the immobilizer system. Much like RKE, the communication signals can be easily monitored by an attacker with legally available tools. To avoid replay attacks, transponders quickly moved to more complex encryption, such as HITAG and AES, as well as the use of challenge and response authentication and, in some cases, rolling codes. Transponders are now typically highly secure devices capable of bidirectional communication with the vehicle. With the ability for the car to send data to a transponder, some transponders have the ability to store hundreds of bytes of information about the key and vehicle. This information may comprise secret encryption keys and comfort features such as the last radio station used or electronic seat position.

In addition to combining the discrete transponders with the key blade, manufacturers began to further combine the key blade, transponder, and RKE functionality into a single device, with some further eliminating the discrete transponder by "emulating" the transponder on the microprocessor used to provide the RKE functionality, along with a single transponder coil. These "combination keys" are both cheaper to produce than transponder keys and remotes produced separately, are more secure, and may enable a combined pairing process for a transponder and remote. The RKE portion and transponder portion of the key can share information providing for the transponder to receive rolling code and encryption key updates from the vehicle. Using a combination key with the transponder and RKE system in communication with one another, the rolling code protocols and encryption techniques may become very advanced and unbreakable to all but the most dedicated attacker.

Additionally, starting in the early to mid-2000s, car keys began incorporating "passive" functionality into RKE systems. An RKE device with passive functionality, or "intelligent" key, may combine everything included within a combination key, but additionally combine 2 more transponder coils into a "3D Coil", each coil oriented in one of three orthogonal planes (x, y, and z). The 3D Coil is used to communicate with multiple vehicle-based LF Coils placed in various locations within the vehicle to enable determination of the position of the key (i.e., user) relative to those various points. Determination of user position enables the passive RKE functionality, which allows the user to push a button on the door handle to unlock the car door when standing beside it, push a button to start the vehicle engine when sitting in the driver's seat, prevent the user from locking their keys in the trunk, or any other feature where key position is a variable needed to support that feature. Unlike the single transponder utilized by the immobilizer system, which must be placed in close proximity to the vehicle's LF coil in order to draw power and communicate, the intelligent key must be self-powered by a battery in order to communicate at a much further distance.

Because the intelligent keys require an operable battery within the key, an "Emergency LF Coil" in communication with the vehicle's immobilizer system remains within most vehicles to provide a user of an intelligent key with an inoperable battery a "fail-safe" method of starting and driving the vehicle. To support the fail-safe, the Emergency LF Coil is located within the vehicle, in close proximity to the driver's seat, and powers and communicates with a either a discrete transponder or emulated transponder via one of the three coils within the 3D Coil. Once the immobilizer system is satisfied that the transponder is authorized, the car may be started. To start the car, some vehicles allow the pressing of the "Start" button while others require the turning of a bladed "Emergency Key".

Due to this high margin of security, modern keys are not something the lay person could replace or add to their vehicle easily. To pair such keys to a car typically requires both a locksmith to cut the blade, if so equipped, and specialized programming tools, unavailable to the public, to pair the transponder and RKE device with the vehicle. Often the vehicle dealer is the only source for keys and pairing tools which leads to high prices for replacement keys/remotes.

Given the complexity of car keys and systems today, automotive key duplication is a complex and expensive process. Car owners may have a difficult time finding replacement keys, especially for older vehicles that may no longer be supported by the original manufacturer or automotive dealership.

Once a vehicle owner has located a source for a new key, they must purchase the device and then pay for a locksmith to "pair" the product to the vehicle. This "pairing" process usually involves the use of an expensive dealer owned programming tool or an aftermarket programming tool. In the pairing process, these tools usually connect to the on-board diagnostics ("OBD") port on the vehicle and communicate with various systems within the vehicle to generate a series of encrypted numerical sequences that are combined in various ways to generate unique vehicle codes that are used to authenticate the key as "trusted" by the vehicle. Generally, this conversation between the tool and the vehicle includes a security transponder, the vehicle electronic control unit ("ECU") or body control module ("BCM"), and the RKE device. If this process is not executed properly or a programming fault occurs, it is possible the vehicle will not start or respond properly to the RKE device. In limited situations, a very expensive process to reset the ECU or BCM of a vehicle must be performed.

As stated above, the process of pairing keys to a vehicle, even by a locksmith, may be a complicated, costly and time-consuming process. Often, only car dealerships have the capability and the costly programming equipment required to pair a key. Therefore, the dealership will charge a premium for this service. As an alternative to having to go to the dealership, lower cost OBD devices have been developed to more cheaply and conveniently pair a key to a vehicle.

Many of these existing key pairing devices must be connected either directly or remotely to external computers or smart devices in order to function, i.e., pair a key with a vehicle. These external computing devices run software pairing algorithms to enable pairing to a wide range of vehicle makes, models, and years. To enable key pairing on select vehicles, these existing key pairing devices typically contain "security access" algorithms embedded within the device itself or stored within or activated by an externally connected device. These security access algorithms may contain secret authentication codes or sequences, initially only known by the OEM, needed to place these select vehicles into a mode that allows key pairing. The existing external computing devices and programming software may also automate some of the pairing process. Solutions of this type, ones that require both an OBD device and an external device, are not true standalone devices. Some OBD devices used in existing key pairing solutions are able to automatically sense and adjust to one of a set of communication protocols such as ISO 11898-4, ISO 15765-4, or SAE J2284/3. Other OBD devices may have the capability to store data about the vehicle such as diagnostic information or information pertaining to various vehicle modules during the pairing process. OBD programming devices may also utilize display elements such as LEDs or LCD screens to provide detailed feedback to the user about the status of the pairing process.

Existing OBD device-based solutions may cause undesired results for the customer if left plugged into the OBD port, either accidentally or intentionally. These undesired results may include the following: physical damage to the vehicle's OBD connector due to shear, compression, or torsion forces between the vehicle's OBD connector and the OBD device; electrical damage to the vehicle's OBD connector or OBD bus due to a weakly designed electrical interface on the OBD device; and draining of the vehicle's battery due to power consumption of the OBD device. In addition to the customer impacts for an individual user, widespread issues with existing OBD systems may result in product liability insurance claims, affecting the reputation and/or profit of the manufacturer of the OBD device.

It may also be desirable to verify that a user of a key pairing device is the owner of a vehicle that the user is attempting to pair a new or replacement vehicle key with.

It may also be desirable to limit the number of uses a key pairing device can be used to pair a key to a vehicle.

What is needed is a system for automatically pairing a vehicle key with a vehicle that addresses the shortcomings of existing OBD-based solutions. What is needed is a truly stand-alone, relatively inexpensive device that does not require connection to any external device, other than to the vehicle itself, to complete a paring process and that keeps the user informed of the status of the pairing process. What is needed is a method of verifying that the user attempting to pair a vehicle key with a vehicle is an authorized owner or user of that vehicle.

SUMMARY OF THE INVENTION

The present invention provides a low cost and limited function key pairing device, or "dongle", used in pairing a vehicle key to a vehicle. The dongle of the present invention connects directly to a vehicle's OBD port. The dongle of the present invention includes two methods for determining a "communication mode" which is one or more sets of communications protocols or sets of command and response sequences. In one embodiment, the dongle automatically determines a bus type or communications protocol and/or a set of command and response sequences to use in pairing the vehicle key with the vehicle. A processor and decision logic are used to query the vehicle and receive a response to select and configure the correct set of command and response sequences and/or the bus type or communications protocol. In another embodiment, a manual switch, which may be a manual rotary switch or other user input such as set of switches, buttons, or touch screen interface, is used to select from predetermined "communication modes", or sets of communication protocols and sets of command and response sequences, that correspond to specific vehicle makes, models, and years. The manual switch may also allow the user to scroll through a list of choices on the device's display.

In one embodiment, the dongle of the present invention executes a specific communications mode, which may include one or more of the bus types, communications protocols, or command and response sequences, based on the correct settings as determined by the processor and logic of the dongle. In another embodiment, depending on the switch setting set by the user, the dongle of the present invention executes a specific communication mode. The dongle of the present invention also may comprise a button to initiate the pairing process with the vehicle, to signal the device to halt, to resume a command and response sequence, to acknowledge a message on the display, and/or to select from a number of choices presented to the user on the display. A buzzer is included to provide audible feedback as to the progress of the pairing process.

The dongle of the present invention may be used to pair a variety of vehicle keys with a variety of vehicles. These varieties of keys include those comprising a transponder, a remote, a combination key, or a passive (or "intelligent") key with a vehicle. A combination key is a type of key that combines an RKE Device, transponder, and key blade into a single unit, and which has been used throughout the industry to operate a wide range of vehicle makes and models. Universal remote head keys or "URHKs" and the systems and methods for programming them are described in METHOD AND APPARATUS FOR IMPLEMENTING MULTI-VENDOR ROLLING CODE KEYLESS ENTRY SYSTEMS, U.S. patent application Ser. No. 14/165,922, filed Jan. 28, 2014, also published as U.S. 2014/0218165, Johnson et al., which is incorporated by reference herein in its entirety. Intelligent keys may combine everything included within a combination key, but additionally include the ability to determine the position of the key (i.e., user) relative to the vehicle, enabling the user to push a button to start the vehicle engine when sitting in the driver's seat or push a button on the door handle to unlock the car door when standing beside it.

The system and method of the present invention also provides for the verification of a "right" to pair a key with a vehicle prior to pairing said key with the vehicle. Vehicle ownership may be verified by confirming that a VIN associated with the vehicle is permitted to be used with the dongle, or by confirming a PIN input by the user. This ensures that the dongle provided to and used by the user can only be used to pair a key with the vehicle for which ownership has been verified. Alternatively, the right may be enabled by verifying the number of pairing cycles the dongle has been used to pair keys to any vehicle is below a predetermined limit stored within the dongle.

In one embodiment, to operate the dongle of the present invention the user turns the rotary switch to a position corresponding to a vehicle make, model, and year they wish to pair a vehicle key with. The user then plugs the dongle of the present invention into the OBD port and inserts, or places in close proximity, the key to be paired with the vehicle into or near the vehicle's LF coil.

In another embodiment, to operate the dongle of the present invention the user simply plugs the dongle of the present invention into the OBD port and inserts, or places in close proximity, the key to be paired with the vehicle into or near the vehicle's LF coil and a processor and a memory comprising a set of executable code with logic for determining a communications mode automatically determines one or more of a communications mode, communications protocol, bus type, or set of commands and responses to be used in communicating with the vehicle in the key pairing process.

Next, upon the user pressing a button to initiate the pairing process, the dongle of the present invention queries the vehicle for its VIN number. The VIN may be checked for authenticity. If considered authentic and not previously paired by the dongle, the dongle of the present invention will store the new VIN. Any number of subsequent keys may be paired for this VIN, up to a maximum number supported by the vehicle. This method of limiting the use of the dongle is "VIN locking".

Alternatively, instead of "VIN locking" the dongle, upon the user pressing a button to initiate the pairing process, the dongle of the present invention simply verifies that the number of pairing cycles the dongle has been used to pair keys to any vehicle is below a predetermined limit stored within the dongle. This method of limiting the use of the dongle is "pairing cycle limiting".

Next, the dongle queries the vehicle to determine the total number of keys already paired with the vehicle. If the maximum number of keys allowed by the vehicle have been paired, the device will enter an error state and signal the error with the buzzer. This check is helpful to the user since it spares the user from waiting through the entire pairing process just for the pairing process to fail due to the max number of keys having already been programmed. Given that vehicles can change hands many times throughout their life, the dongle may provide a signal indicating the number of keys currently paired or programmed with the vehicle. This provides valuable information to the user, letting the user know how many keys are currently programmed to the vehicle. In the case that the user is concerned that the number of keys programmed is more than they expect or desire, the user may press a button on the dongle during a specific time frame to initiate a key erasing process. The key erasing process would remove any paired or programmed keys from the vehicle.

After it is determined by the dongle that space exists within the vehicle for additional keys, the dongle will initiate the pairing process. The successful start of this process is again signaled with the buzzer. On some vehicles, the pairing process can take several minutes to complete. During this period, the dongle periodically signals that the process is on-going by use of the buzzer. Throughout this entire process, error checking is performed on all communications. The dongle will halt the process and signal the error if any are detected.

Upon the vehicle signaling the dongle that the key was successfully paired, the dongle signals this success again by emitting a success signal with the buzzer and, if pairing cycle limiting is enabled, updating a counter corresponding to the number of completed pairing cycles. At this point, the user moves the paired key away from the vehicle's LF coil and removes the dongle from the OBD port. If for some reason the user fails to remove the dongle after a given time, the dongle will sound a continuous alarm until removed.

Some vehicles require additional steps or user input to complete the key pairing process. For these vehicles, simple buzzer signal production by the dongle may be insufficient to provide the necessary feedback to the user to indicate which step within the pairing process the dongle is and what feedback or input is required from the user. For these vehicles, a screen may be used on the dongle to provide the additional required information to the user in the form of codes or text output on the screen. In addition, the screen in conjunction with the rotary switch and button may also be used to gather additional required information from the user by displaying a list of choices and allowing the user to scroll through and select one or more from the list.

In another embodiment of the dongle of the present invention, which may be a general purpose OBD programming device, the user turns the rotary switch on the dongle to select the vehicle make, model, and year they wish to pair a with. The user then plugs the dongle of the present invention into the OBD port and inserts, or places in close proximity, the key to be paired with the vehicle into, or near, the vehicle's LF coil.

Within the current embodiment, upon the user pressing a button to initiate the pairing process, the dongle of the present invention may implement the VIN locking method or the pairing cycle limiting method described previously to verify the right of the user to initiate the pairing process. If the user has the right to proceed, the pairing process is initiated.

Next, the dongle of the present invention executes a security access algorithm to place the vehicle into a mode that allows key pairing. The dongle then displays any necessary messages to the user on a screen on the device and waits for user input. When the required user input is received, the programming process continues or halts based on the user input. Upon the vehicle signaling the dongle that the key was successfully paired, the dongle signals this success again by emitting a success signal with the buzzer and, if pairing cycle locking is enabled, updating a counter corresponding to the number of completed pairing cycles. At this point, the user removes the paired key away from the vehicle's LF coil and removes the dongle from the OBD port. If for some reason the user fails to remove the dongle after a given time, the dongle will sound a continuous alarm until removed.

The security access algorithm of the current embodiment may consist of the steps of reading the BCM number via the vehicle OBD port and automatically determining a 4-digit PIN or a 20-character PIN based on the read BCM number. The 4 digit and 20-character PINs are associated with the vehicle and are derived from the BCM number.

The dongle of the present invention is a true standalone device. It does not require connection to any device other than the vehicle OBD port. The dongle of the present invention automatically determines a communications mode, which includes a bus type, communications protocol, and/or set of command and response sequences, or may require that the user manually select a setting before initiating the pairing process. The pairing is initiated by the pressing of a single button. Other dongles may require the pressing of multiple buttons or a sequence of buttons. The VIN locking method used by the dongle of the present invention provides for user programming of multiple keys to their vehicle, but not to multiple vehicles. Within the limits of the maximum number of keys their vehicle allows, this provides the advantage to the user of being able to re-use the OBD programming dongle of the present invention to pair as many keys as they desire. In addition, this feature provides additional revenue to the manufacturer by preventing re-use of this product to pair keys to multiple vehicles. Furthermore, this feature helps to increase the operating costs of criminals seeking to re-use this tool for nefarious purposes on multiple vehicles.

The VIN locking method used by the dongle of the present invention provides for user programming of multiple keys to their vehicle, but not to multiple vehicles. Within the limits of the maximum number of keys their vehicle allows, this provides the advantage to the user of being able to re-use the OBD programming dongle of the present invention to pair as many keys as they desire. In addition, this feature provides additional revenue to the manufacturer by preventing re-use of this product to pair keys to multiple vehicles. Furthermore, this feature helps to increase the operating costs of criminals seeking to re-use this tool for nefarious purposes on multiple vehicles.

The pairing cycle limiting method used by the dongle of the present invention provides for user programming of multiple keys to multiple vehicles, up to a set programming cycle limit. This feature provides additional revenue to the manufacturer by limiting the re-use of this product to a set programming cycle limit.

The OBD programming dongle of the present invention beeps a number of times equivalent to the number of keys paired to the vehicle which informs the user of how many keys are "trusted" by the vehicle, but not necessarily known or trusted by the user. The OBD programming dongle of the present invention also provides for the erasing of all paired keys which provides security by allowing the user to remove one or more existing un-trusted keys and to add back only new trusted keys. In addition, this provides for user key pairing without requiring the user to take the car to a dealership or locksmith.

In another embodiment, the present invention provides a method of pairing a set of vehicle keys to a vehicle by an dongle, the method comprising: selecting, by a physical switch on the dongle, a communication mode; inserting the dongle into a vehicle OBD port; initiating, by user actuation of a button on the dongle, a key pairing process, the key pairing process comprising: initiating communications between the dongle and the vehicle via the vehicle OBD port using the selected communications mode; reading, by the dongle, a VIN from the vehicle; verifying that the number of pairing cycles the dongle has been used to pair keys to any vehicle is below a predetermined limit stored within the dongle; identifying, by the dongle from the vehicle, a number of existing keys already paired with the vehicle; automatically pairing, by the dongle, a vehicle key from the set of vehicle keys with the vehicle; verifying that the automatic pairing of the vehicle key from the set of vehicle keys with the vehicle was successful.

The method may further comprise: determining that the selected communications mode is not compatible with the vehicle; and terminating the key pairing process. The method may further comprise emitting, by the dongle, an audible signal when the key pairing process is terminated. The method may further comprise: determining that the VIN read from the vehicle matches a stored VIN in the dongle; and continuing the key pairing process. The method may further comprise: verifying that the number of pairing cycles the dongle has been used to pair keys to any vehicle is below a predetermined limit stored within the dongle; and continuing the key pairing process. The method may further comprise emitting, by the dongle, an audible signal indicating the key pairing process is continuing. The method may further comprise: determining that the VIN read from the vehicle does not match a stored VIN in the dongle; and terminating the key pairing process. The method may further comprise: determining that the number of pairing cycles the dongle has been used to pair keys to any vehicle is equal to or greater than a predetermined limit stored within the dongle; and terminating the key pairing process. The method may further comprise emitting an audible signal to indicate the number of existing keys paired with the vehicle, identified by reading this information from the vehicle through the vehicle's OBD port. The method may further comprise: receiving a user input to erase all stored or paired keys from the vehicle; and erasing all stored or paired keys from the vehicle. The method may further comprise emitting, by the dongle, an audible signal when the key pairing process is terminated. The method may further comprise: determining that the identified number of existing keys exceeds a predetermined threshold; and terminating the key pairing process. The method may further comprise repeating the key pairing process for another vehicle key in the set of vehicle keys. The method may further comprise emitting, by the dongle, an audible signal indicating the key pairing process is complete. The method may further comprise emitting, by the dongle, an audible signal indicating the key pairing process has initiated. The method may further comprise intermittently emitting, by port dongle, during the key pairing process an audible signal indicating the key pairing process has not encountered an error. The method may further comprise updating a counter corresponding to the number of completed pairing cycles when the pairing process is complete for a set of keys or, alternatively, after the pairing process is initiated. The method may further comprise inserting the vehicle key from the set of vehicle keys being paired in the key pairing process into an ignition in the vehicle. The method may further comprise turning the ignition to an on position.

In another embodiment, the present invention provides a system for pairing a set of vehicle keys to a vehicle by an OBD port dongle, the system comprising: an unpaired vehicle key; a dongle comprising a physical switch, a button, and an audible signal transmitter, the dongle adapted to mate with an OBD port on a vehicle; wherein the physical switch on the dongle is adapted to provide for selection by a user of a communication mode; wherein the dongle is configured to initiate, by user actuation of the button on the dongle, a key pairing process, the key pairing process comprising: initiating communications between the dongle and the vehicle via the vehicle OBD port using the selected communications mode; updating, by the dongle, a counter corresponding to the number of initiated pairing cycles; reading, by the dongle, a VIN from the vehicle; verifying that the number of pairing cycles the dongle has been used to pair keys to any vehicle is below a predetermined limit stored within the dongle; reading, by the dongle, from the vehicle, a number of existing keys already paired with the vehicle; automatically pairing, by the dongle, the unpaired vehicle key with the vehicle; verifying that the automatic pairing of the vehicle key from the set of vehicle keys with the vehicle was successful; and updating, by the dongle, a counter corresponding to the number of completed pairing cycles.

In another embodiment, the present invention provides a dongle adapted to pair an unpaired vehicle key with a vehicle, the dongle comprising: a physical switch; a button; an audible signal generator; wherein the physical switch on the dongle is adapted to provide for selection by a user of a communication mode from a set of communications modes; and wherein the dongle is configured to initiate, by user actuation of the button on the dongle, a key pairing process, the key pairing process comprising: initiating communications between the dongle and the vehicle via the vehicle OBD port using the selected communications mode; updating, by the dongle, a counter corresponding to the number of initiated pairing cycles; reading, by the dongle, a VIN from the vehicle; reading, by the dongle, from the vehicle, a number of existing keys already paired with the vehicle; automatically pairing, by the dongle, the unpaired vehicle key with the vehicle; verifying that the automatic pairing of the vehicle key from the set of vehicle keys with the vehicle was successful; and updating, by the dongle, a counter corresponding to the number of completed pairing cycles.

In another embodiment, the present invention provides a method of pairing a set of vehicle keys to a vehicle by a dongle, the method comprising: selecting, by a physical switch on the dongle, a communication mode; inserting the dongle into a vehicle OBD port; initiating, by user actuation of a button on the dongle, a key pairing process, the key pairing process comprising: initiating communications between the dongle and the vehicle via the vehicle OBD port using the selected communications mode; updating, by the dongle, a counter corresponding to the number of initiated pairing cycles; reading, by the dongle, a VIN from the vehicle; reading, by the dongle, from the vehicle, a number of existing keys already paired with the vehicle; executing a security access algorithm to place the vehicle into a mode that allows key pairing; prompting the user for input by a display on the OBD port dongle; receiving user input from the button on the OBD port dongle; verifying that the automatic pairing of the vehicle key from the set of vehicle keys with the vehicle was successful; and updating, by the dongle, a counter corresponding to the number of completed pairing cycles.

In another embodiment, the present invention provides a method of pairing a set of vehicle keys to a vehicle by a dongle, the method comprising: selecting, by a physical switch on the dongle, a communication mode; inserting the dongle into a vehicle communications port; initiating, by user actuation of a button on the dongle, a key pairing process, the key pairing process comprising: initiating communications between the dongle and the vehicle via the vehicle communications port using the selected communications mode; identifying, by the dongle, a number of existing keys already paired with the vehicle; automatically pairing, by the dongle, a vehicle key from the set of vehicle keys with the vehicle; verifying that the automatic pairing of the vehicle key from the set of vehicle keys with the vehicle was successful.

The method of the above embodiment may further comprise determining that the selected communications mode is not compatible with the vehicle; and terminating the key pairing process. The method may further comprise: reading, by the dongle, a VIN from the vehicle; determining that the VIN read from the vehicle matches a stored VIN in the dongle; and continuing the key pairing process. The method may further comprise emitting, by the dongle: a first audible signal indicating the key pairing process is continuing; and a second audible signal indicating the key pairing process is terminated. The method may further comprise: reading, by the dongle, a VIN from the vehicle; determining that the VIN read from the vehicle does not match a stored VIN in the dongle; and terminating the key pairing process. The method may further comprise: determining that the identified number of existing keys exceeds a predetermined threshold; and terminating the key pairing process. The method may further comprise repeating the key pairing process for an other vehicle key in the set of vehicle keys. The method may further comprise emitting, by the dongle: a first audible signal indicating the key pairing process has initiated; and a second audible signal indicating the key pairing process is complete. The method may further comprise intermittently emitting, by the dongle, during the key pairing process an audible signal indicating the key pairing process has not encountered an error. The method may further comprise: inserting the vehicle key from the set of vehicle keys being paired in the key pairing process into an ignition in the vehicle; and turning the ignition to an on position. The method may further comprise: reading, by the dongle, a VIN from the vehicle; determining that the VIN read from the vehicle matches a stored VIN in the dongle; determining a number of times the key pairing process has been initiated for the VIN read from the vehicle; and upon determining that the determined number of times the key pairing process has been initiated for the VIN read from the vehicle has exceeded a predetermined limit, terminating the key pairing process. The method may further comprise: reading, by the dongle, a VIN from the vehicle; determining that the VIN read from the vehicle does not match a stored VIN in the dongle; storing the VIN read from the vehicle in the dongle; and upon verifying that the automatic pairing was successful, updating a counter associated with the VIN read from the vehicle and stored in the dongle.

In another embodiment, the present invention provides a system for pairing a set of vehicle keys to a vehicle by a dongle, the system comprising: an unpaired vehicle key; a dongle comprising a physical switch, a button, and an audible signal transmitter, the dongle adapted to mate with a communications port on a vehicle; wherein the physical switch on the dongle is adapted to provide for selection by a user of a communication mode; wherein the dongle is configured to initiate, by user actuation of the button on the dongle, a key pairing process, the key pairing process comprising: initiating communications between the dongle and the vehicle via the vehicle communications port using the selected communications mode; identifying, by the dongle, a number of existing keys already paired with the vehicle; automatically pairing, by the dongle, the unpaired vehicle key with the vehicle; and verifying that the automatic pairing of the vehicle key from the set of vehicle keys with the vehicle was successful.

The key pairing process of the system may further comprise: determining that the selected communications mode is not compatible with the vehicle; and terminating the key pairing process. The key pairing process of the system may further comprise: reading, by the dongle, a VIN from the vehicle; determining that the VIN read from the vehicle matches a stored VIN in the dongle; and continuing the key pairing process. The key pairing process of the system may further comprise: reading, by the dongle, a VIN from the vehicle; determining that the VIN read from the vehicle does not match a stored VIN in the dongle; and terminating the key pairing process. The key pairing process of the system may further comprise receiving, by the dongle a PIN required to initiate the key pairing process. The key pairing process of the system may further comprise: determining that the identified number of existing keys exceeds a predetermined threshold; and terminating the key pairing process. The dongle may be configured to become inoperable after the key pairing process is performed a predetermined number of times. The key pairing process of the system may further comprise: receiving an additional actuation of the button on the dongle; and unpairing a set of all paired vehicle keys from the vehicle.

In another embodiment, the present invention provides a dongle adapted to pair an unpaired vehicle key with a vehicle, the dongle comprising: a physical switch; a button; an audible signal generator; wherein the physical switch on the dongle is adapted to provide for selection by a user of a communication mode from a set of communications modes; and wherein the dongle is configured to initiate, by user actuation of the button on the dongle, a key pairing process, the key pairing process comprising: initiating communications between the dongle and the vehicle via the vehicle communications port using the selected communications mode; identifying, by the dongle, a number of existing keys already paired with the vehicle; automatically pairing, by the dongle, the unpaired vehicle key with the vehicle; and verifying that the automatic pairing of the vehicle key from the set of vehicle keys with the vehicle was successful.

The key pairing process of the dongle may further comprise: determining that the selected communications mode is not compatible with the vehicle; and terminating the key pairing process. The key pairing process of the dongle may further comprise: reading, by the dongle, a VIN from the vehicle; determining that the VIN read from the vehicle matches a stored VIN in the dongle; and continuing the key pairing process. The key pairing process of the dongle may further comprise: reading, by the dongle, a VIN from the vehicle; determining that the VIN read from the vehicle does not match a stored VIN in the dongle; and terminating the key pairing process. The key pairing process of the dongle may further comprise receiving, by the dongle a PIN required to initiate the key pairing process. The key pairing process of the dongle may further comprise: determining that the identified number of existing keys exceeds a predetermined threshold; and terminating the key pairing process. The dongle may be configured to become inoperable after the key pairing process is performed a predetermined number of times. The key pairing process of the dongle may further comprise: receiving an additional actuation of the button on the dongle; and unpairing a set of all paired vehicle keys from the vehicle.

In another embodiment, the present invention provides a method of pairing an unpaired vehicle key to a vehicle by a dongle, the method comprising: initiating, by user actuation of a button on the dongle, a key pairing process, the key pairing process comprising: initiating communications between the dongle and the vehicle by a user selected communications mode; reading, by the dongle, a VIN from the vehicle; comparing, by the dongle, the VIN read from the vehicle with a set of VINs stored on the dongle; determining, by the dongle, that the VIN read from the vehicle matches a VIN from the set of VINs; and automatically pairing, by the dongle, the unpaired vehicle key with the vehicle.

The method of the above embodiment may further comprise: determining, by the dongle, that the VIN read from the vehicle does not match a VIN from the set of VINs; and terminating the key pairing process. The method may further comprise: terminating the key pairing process based upon determining, by the dongle, that the key pairing process has been initiated and completed a number of times exceeding a predetermined threshold. The method may further comprise wherein initiating the key pairing process further comprises receiving an input of a PIN from a set of hashed PINs.

In another embodiment, the present invention provides a dongle adapted to pair an unpaired vehicle key with a vehicle, the dongle comprising: a button; an audible signal generator; a processor; and a memory comprising a set of executable code when executed by the processor configured to: initiate, by user actuation of the button on the dongle, a key pairing process, the key pairing process comprising: initiating communications between the dongle and the vehicle via the vehicle communications port using a determined communications mode; identifying, by the dongle, a number of existing keys already paired with the vehicle; automatically pairing, by the dongle, the unpaired vehicle key with the vehicle; and verifying that the automatic pairing of the vehicle key from the set of vehicle keys with the vehicle was successful.

The dongle of the above embodiment may further comprise, wherein the determined communications mode is a communications mode automatically determined by the dongle to be used in the key pairing process. The communications mode may comprise one or more of a communications protocol, a bus type, or a set of commands and responses. The key pairing process may further comprise: determining that the determined communications mode is not compatible with the vehicle; and terminating the key pairing process. The key pairing process may further comprise: reading, by the dongle, a VIN from the vehicle; determining that the VIN read from the vehicle matches a stored VIN in the dongle; and continuing the key pairing process. The key pairing process may further comprise: reading, by the dongle, a VIN from the vehicle; determining that the VIN read from the vehicle does not match a stored VIN in the dongle; and terminating the key pairing process. The key pairing process may further comprise: determining that the identified number of existing keys exceeds a predetermined threshold; and terminating the key pairing process. The dongle may be configured to become inoperable after the key pairing process is performed a predetermined number of times. The key pairing process may further comprise: receiving an additional actuation of the button on the dongle; and unpairing a set of all paired vehicle keys from the vehicle. The dongle may further comprise a rotating switch, the rotating switch providing for navigating and selecting settings or configurations for the dongle.

In another embodiment, the present invention provides a method of pairing an unpaired vehicle key to a vehicle by a dongle, the method comprising: initiating, by user actuation of a button on the dongle, a key pairing process, the key pairing process comprising: initiating communications between the dongle and the vehicle by a communications mode; reading, by the dongle, a VIN from the vehicle; comparing, by the dongle, the VIN read from the vehicle with a set of VINs stored on the dongle; determining, by the dongle, that the VIN read from the vehicle matches a VIN from the set of VINs; and automatically pairing, by the dongle, the unpaired vehicle key with the vehicle.

The method of the above embodiment may further comprise, automatically determining the communications mode by the dongle. The method may further comprise automatically determining by the dongle one or more of a communications protocol, a bus type, or a set of commands and functions to be used in communicating with the vehicle in the key pairing process. The determined communications mode may be based on a user selected communications mode. The method may further comprise: determining, by the dongle, that the VIN read from the vehicle does not match a VIN from the set of VINs; and terminating the key pairing process. The method may further comprise: terminating the key pairing process based upon determining, by the dongle, that the key pairing process has been initiated and completed a number of times exceeding a predetermined threshold. The method may further comprise: determining a number of times the key pairing process has been initiated for the VIN read from the vehicle; and upon determining that the determined number of times the key pairing process has been initiated for the VIN read from the vehicle has exceeded a predetermined limit, terminating the key pairing process.

BRIEF DESCRIPTION OF THE DRAWINGS

To facilitate a full understanding of the present invention, reference is now made to the accompanying drawings, in which like elements are referenced with like numerals. These drawings should not be construed as limiting the present invention but are intended to be exemplary and for reference.

DETAILED DESCRIPTION

The present invention will now be described in more detail with reference to exemplary embodiments as shown in the accompanying drawings. While the present invention is described herein with reference to the exemplary embodiments, it should be understood that the present invention is not limited to such exemplary embodiments. Those possessing ordinary skill in the art and having access to the teachings herein will recognize additional implementations, modifications, and embodiments, as well as other applications for use of the invention, which are fully contemplated herein as within the scope of the present invention as disclosed and claimed herein, and with respect to which the present invention could be of significant utility.

Figure 1:
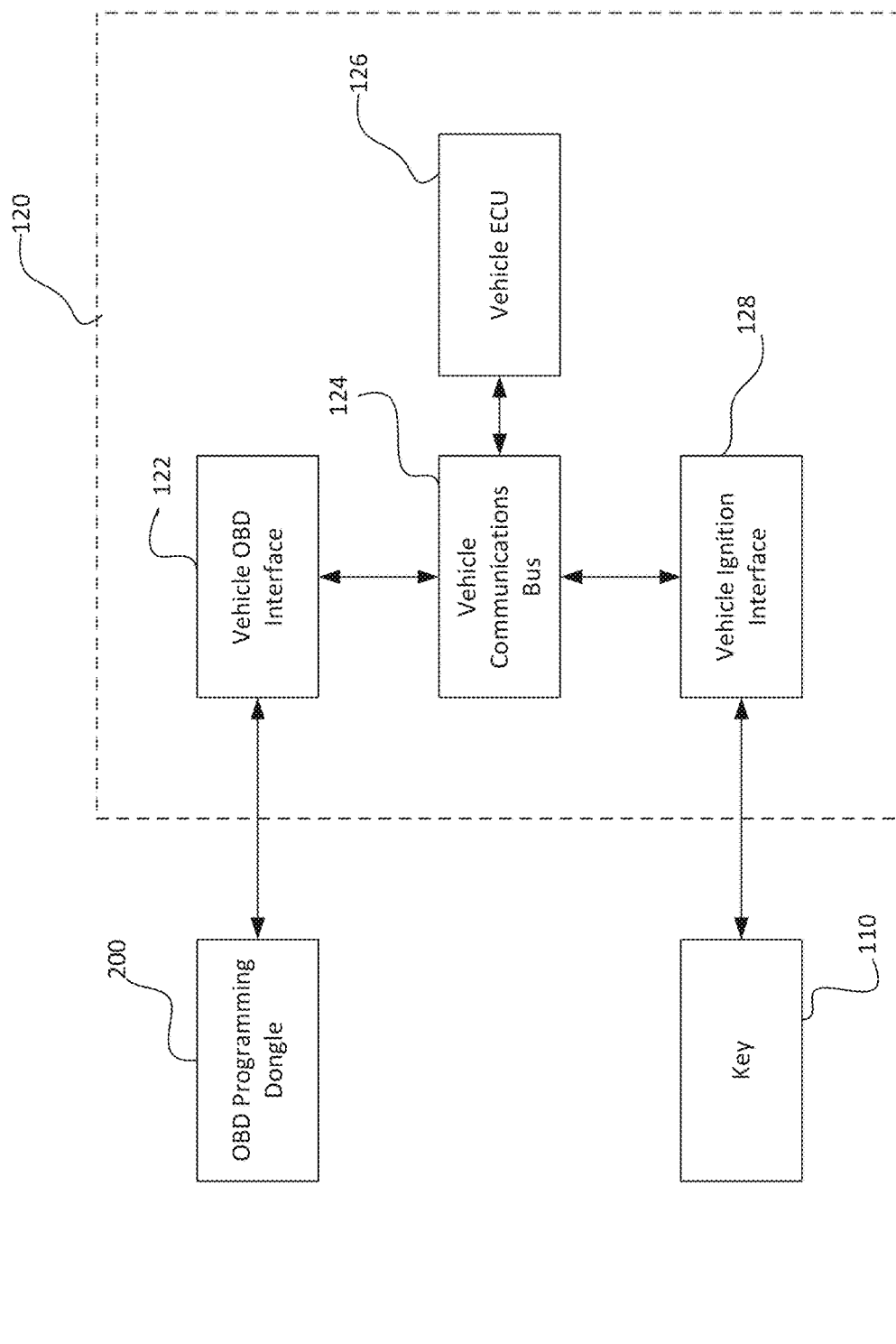
FIG. 1 provides a block-diagram schematic view of one embodiment of the system for pairing a vehicle key with a vehicle by the dongle of the present invention.

With reference now to FIG. 1, a simplified block diagram of a system 100 for pairing a vehicle key 110 with a vehicle 120 is provided. The vehicle 120 comprises a vehicle OBD interface 122, a vehicle communications bus 124, a vehicle ECU 126, and a vehicle ignition interface 128. ECU refers to Electronic Control Unit but also represents other terms frequently used such as PCM (Powertrain Control Module) and ECM (Engine or Electronic Control Module) that represent components that perform similar functions in a vehicle. Often the term used for any given vehicle is manufacturer dependent. The vehicle OBD interface 122, ECU 126, and ignition 128 communicate with one another via the vehicle communications bus 124. Additional elements may comprise the vehicle 120 including additional electronic and control components connected via the vehicle communications bus 124. The dongle 200 is connected to or inserted into the vehicle OBD interface 122 to facilitate pairing of the key 110 with the vehicle 120.

Figure 2:
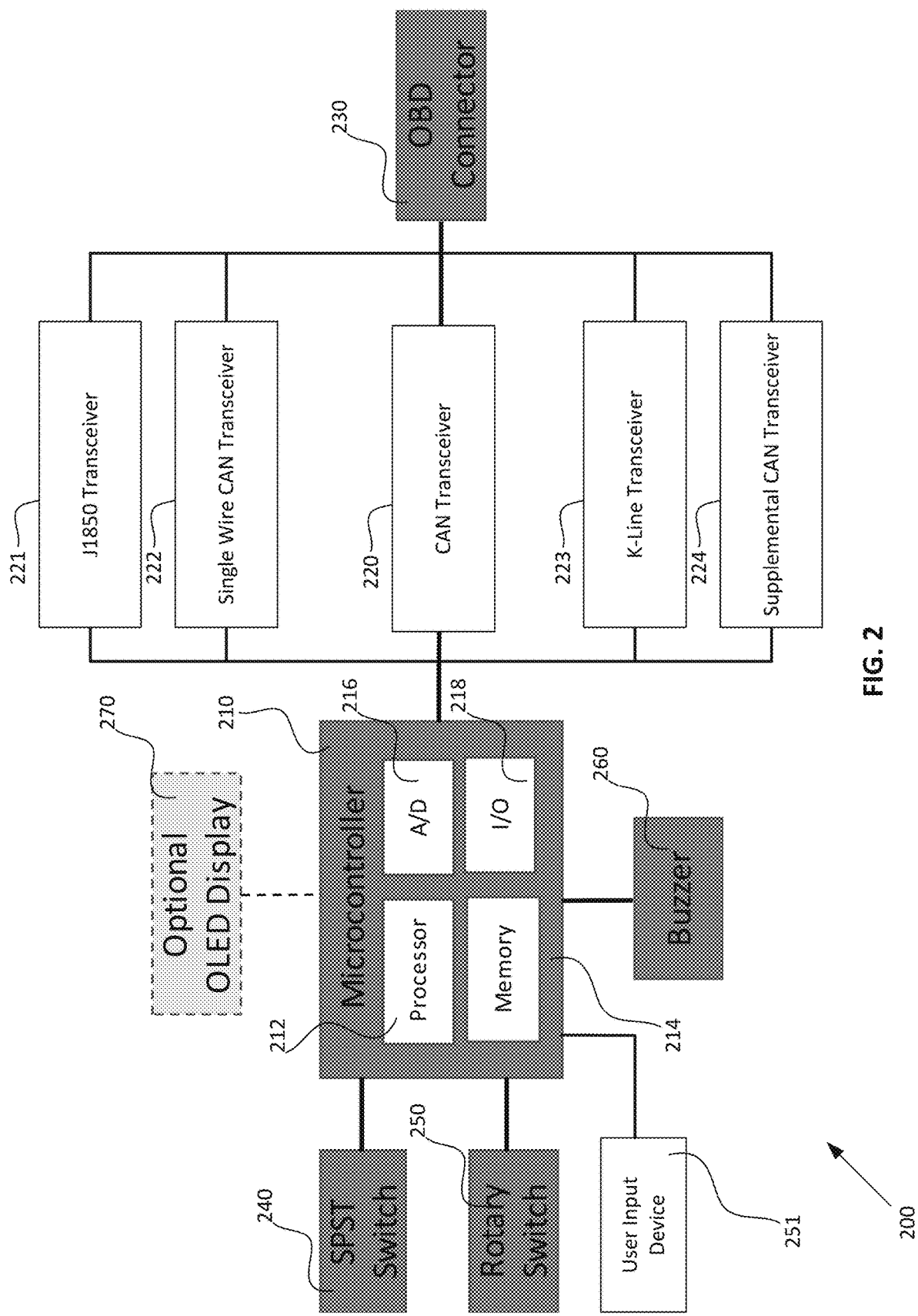
FIG. 2 provides a simplified block-diagram of one embodiment of the dongle of the present invention.

With reference to FIG. 2, a simplified block diagram of the dongle 200 is provided. The dongle 200 comprises a microcontroller 210 which comprises a processor 212, memory 214, analog to digital signal converter 216, and input/output interface 218. The dongle 200 further comprises a communications area network ("CAN") transceiver 220, OBD connector 230, switch 240, e.g., single-pole/single-throw (SPST) type switch, rotary switch 250, which may be a multi-position switch, and buzzer 260. In some embodiments, the dongle 200 may further comprise a display such as an OLED display 270 connected to the microcontroller 210. The CAN transceiver 220 may be used with additional transceivers, such as the J1850 transceiver 221, single wire CAN transceiver 222, K-Line transceiver 223, or supplemental CAN transceiver 224. The appropriate transceiver, communications mode, communications protocol, and/or set of commands and responses to be used in communicating with a vehicle in a key pairing process are automatically determined by the dongle 200 using a set of code and logic stored in the memory 214 and executed by the processor 212. The appropriate settings and configuration are determined in part by querying the vehicle and evaluating responses by the vehicle computer or OBD system, or by measuring signals or voltages over the OBD interface at the OBD connector 230. The rotary switch 250 may also be used to enable user selection of a communications protocol to be used by the dongle 200 to communicate with a vehicle. The switch 240 enables a user to initiate a key pairing process or to otherwise interact with the dongle 200 as required. The switch 250 may also be used as a "jog dial" to interface or interact with the display 270 or to more quickly change or select from settings or configurations.

In another embodiment, another user input device 251 may be used with or instead of the switch 250 and may be a set of toggle switches, a set of buttons, a directional pad, a hat switch, or a capacitive touch interface. The dongle 200 communicates with the electronic systems of a vehicle, such as vehicle 120, through the OBD connector 230 which would mate with the OBD interface or port 122 of the vehicle by way of the CAN transceiver 220 in the dongle 200. The dongle 200 may also comprise a buzzer, speaker, or other audio signal generator for generating user interpretable audio signals, and/or a display for visual prompts. The memory 214 may store a set of code or logic to be executed by the processor 212 to automatically determine a communications mode, communications protocol, bus type, and/or set of commands and responses to be used with the vehicle 120 to complete a pairing process with the vehicle key. This may include a set of logic for querying the vehicle 120 and receiving a response, and based on that response configuring one or more of the communications mode, communications protocol, bus type, or set of commands and responses to successfully complete a pairing process.

Figure 3:
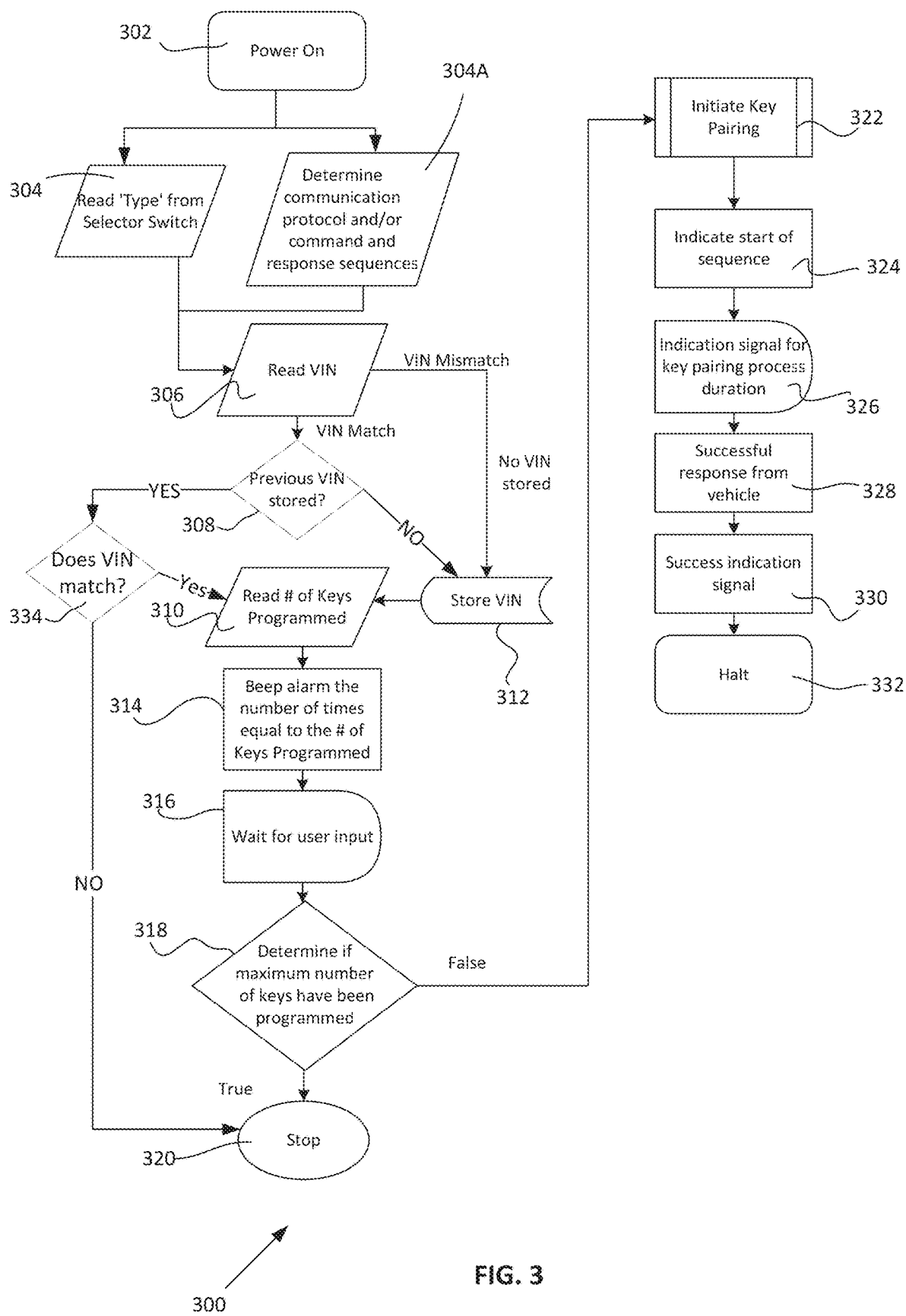
FIG. 3 provides a flowchart illustrating the general process of programming a vehicle key by a programming dongle according to one embodiment of the invention.

With reference now to FIG. 3, a flowchart illustrating the general process 300 of programming a vehicle key by a dongle according to one embodiment of the invention is provided. At 302 the dongle, such as the dongle 200 shown in FIG. 2, is powered on by user operation, such as by the switch 240, or by simply connecting the dongle 200 to the vehicle 120. At 304 the dongle 200 is provided the state of the rotary switch 250 which indicates which communications protocol the dongle 200 is to use to communicate with the vehicle 120. Alternatively, the dongle 200 may automatically determine at 304A the set of commands and responses and/or bus type to be used in to communicate with the vehicle. The automatic determination in step 304A may be used instead of or in addition to the user selection by the rotary switch 250 or other user input 251. At 304 the dongle 200 reads the VIN code from the vehicle.

At 308, the dongle tests if there is a previously stored VIN code in the memory 214. If there was no previously stored VIN code, the VIN code is stored at 312. If a VIN code is stored by the dongle 200 that does not match the VIN code read at 306, the process will halt. If the VIN code is determined to be a match at 334, the dongle reads the number of keys currently paired with or programmed to the vehicle at 310. This provides the user with information as to how many keys are paired with the vehicle so that the user can decide whether or not to erase all paired keys with the vehicle or know if a maximum number of keys have been paired. At 314, the dongle 200 emits an audible signal, e.g., by sounding a buzzer 260, based on the number of keys programmed or paired with the vehicle. At step 316 the dongle 200 may wait for further user input as required, such as waiting for input indicating the number of keys to be paired, or input to proceed with the pairing process. At 318, it is determined if the vehicle has reached a maximum number of paired keys. For example, some vehicles may have a maximum number of keys, e.g., eight, programmed at any given time. If the maximum number of keys have been paired, the process stops at 320.

At 322 if the vehicle can pair additional keys, the key pairing process begins and then the dongle 200 indicates to the user at 324 that the key pairing has begun. At 326, the dongle 200 provides audible feedback to the user, such as by producing a short audio signal every 15 seconds, indicating that the key pairing process 322 is continuing. At the conclusion of the key pairing process 322, if it is determined that the pairing process was a success at 328 a success signal is provided at 330 to indicate to the user that the process was successful. The process halts at 332.

With reference now to FIGS. 4-8 a set of flowcharts illustrating another embodiment of a process for programming a vehicle key by a dongle according to the present invention are provided. User actions are shown in the processes 700 and 800, while dongle 200 performed actions are shown in processes 400, 500, and 600. Prior to powering on the device, at 702 the user may determine the setting for the rotary switch 250 and sets the switch to the proper position at 704. The steps 702 and 704 may not be required if the communications mode, communications protocol, bus type, or set of commands and responses is automatically determined by the dongle 200. At 706, the dongle 200 is inserted by the user into a vehicle OBD interface 122 and powers on at 402. The user then puts the vehicle key 110 into the vehicle ignition 128 and turns on the vehicle 120 at 710. When the vehicle 120 is on, at 712 the user presses a button or switch 240 on the dongle 200. If the dongle 200 enters an error state during any step in the process or a communication error occurs, the process halts and an error alarm is sounded.

If the button 240 has been pressed at 404, the dongle 200 reads the state of the switch 250 at 406, however, if the type selected is incorrect, an error signal is provided at 408. Alternatively, the dongle 200 may automatically determine at 407 the set of commands and responses and/or bus type to be used in to communicate with the vehicle. The automatic determination in step 407 may be used instead of or in addition to the user selection by the rotary switch 250 or other user input 251. If the communications protocol selected by the user and read at 406, or the communications mode automatically determined by the dongle in step 407, is correct, the vehicle 120 VIN code is read at 410. If there is no VIN previously stored 426 in the memory 214 of the dongle 200, at 416 the VIN read at 410 is stored. If the VIN read at 410 does not match a VIN previously stored, at 414 the dongle enters an alarm state at 412 and halts the process. If the VIN matches a stored VIN at 414 the process continues. At 418 the dongle 200 determines the number of keys paired or programmed with the vehicle 120. At 420 if it is determined that the dongle 200 can erase all keys paired or programmed with the vehicle 120, the process continues at B shown in FIG. 5, otherwise it proceeds to step 422. At 422 if the maximum number of keys has been paired with a vehicle, such as 4 or 8 keys based on vehicle make, model, and year, the dongle 200 produces eight error tones at 424 and the process halts. Otherwise, the process continues at C shown in FIG. 6.

The process 500 shows the steps for erasing all keys paired with a vehicle if the feature is enabled on the dongle 200. At 502 the dongle 200 indicates the number of keys paired with the vehicle through audio tones. At 504, the dongle 200 waits for user input, if the input is received, at 506 the dongle 200 erases all keys paired with the vehicle. At 508, the dongle 200 sets a flag that will require the pairing of at least a second key with the vehicle 120 for the pairing process to complete. If the user input is not received at 504, the process continues at 510. At 510 if the maximum number of keys has been paired with a vehicle, such as 4 or 8 keys based on vehicle make, model, and year, the dongle 200 may produce error tones at 512 and the process halts, otherwise the process continues at C shown in FIG. 6.

The process 600 shows the key pairing process by the dongle 200. At 602 the key pairing is initiated. If the sequence starts successfully, an audio signal is produced at 604. The process of pairing a key 110 with a vehicle 120 may take ten minutes or more, and during this time, an audio signal may be produced by the dongle 200 every 5-20 seconds to indicate that the dongle is still "working" on the pairing process as shown in step 606. At 608, the dongle 200 looks for a successful response from the vehicle. If the successful response is received at 608, the dongle emits an audible success indication, such as three tones, at step 610. If it is determined at 612 that no second or additional key is to be programmed, the process halts at 618. At 620, if the user has not removed the dongle 200 after 5 minutes of the process halting at 618, the dongle 200 sounds a tone or alarm continuously until it is removed at 622. In case a second or additional key is to be programmed, the dongle has a second or additional key programming flag set as determined at 612, the dongle 200 waits for the second or additional key to be inserted into the vehicle ignition 128 and for the vehicle 120 to be turned on. The second key flag is cleared at 616, and the process returns to 608 to program the second or additional key.

As shown in the user process 800, the user waits for the success signal from 610 in step 802. Upon receiving the success signal from the dongle 200, the user turns the vehicle 120 off at 804, and removes the key at 806. At 808 if the user did not press the button 240 on the dongle 200 to erase all keys, the process halts at 810. Otherwise, at 812, the user inserts the second or additional key into the ignition 128 and turns the vehicle 120 on at 814 to program the second or additional key.

Figure 9:
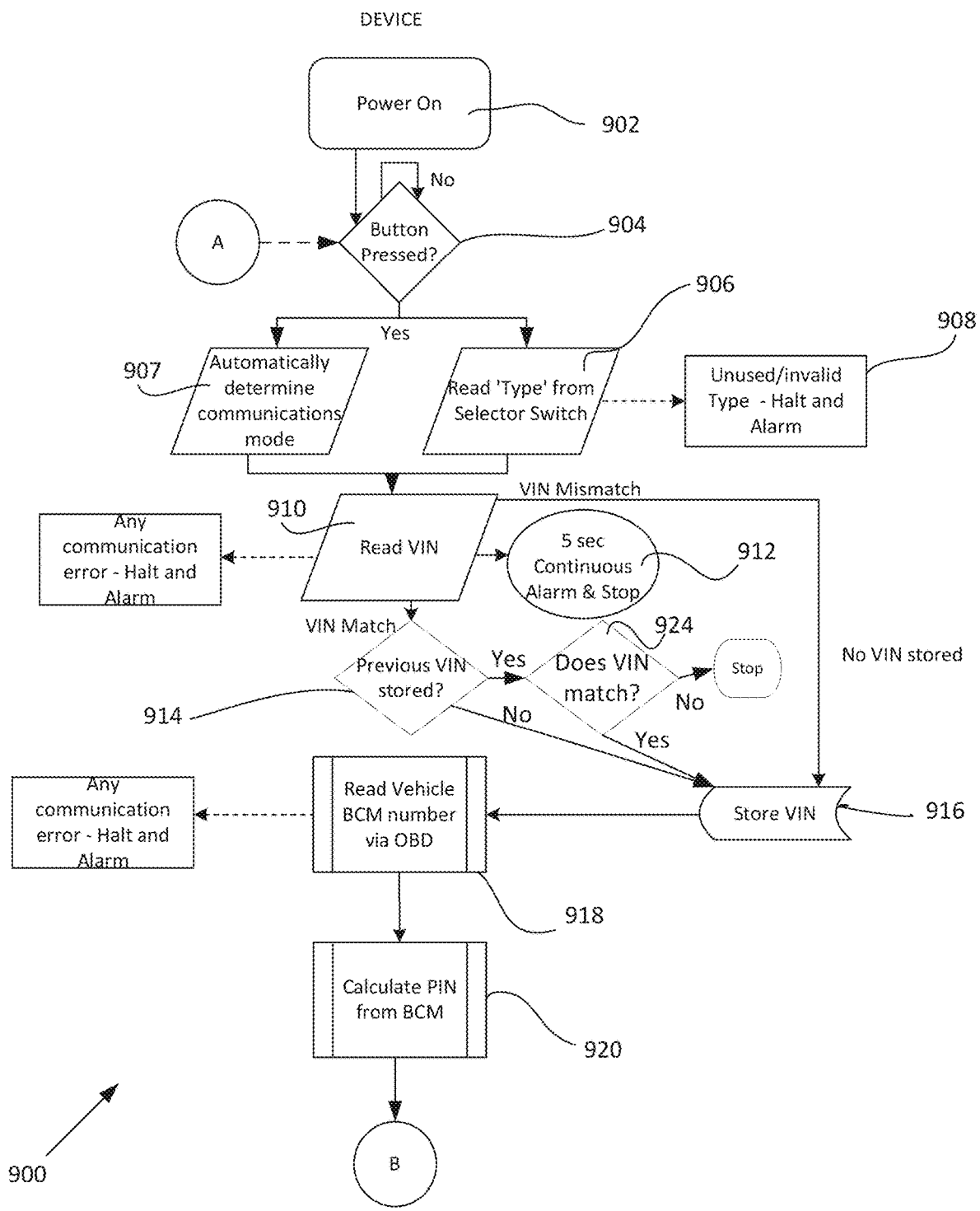
FIGS. 9-11 provide a set of flowcharts illustrating another embodiment of a process for programming a vehicle key by a dongle according to the present invention.
Figure 10:
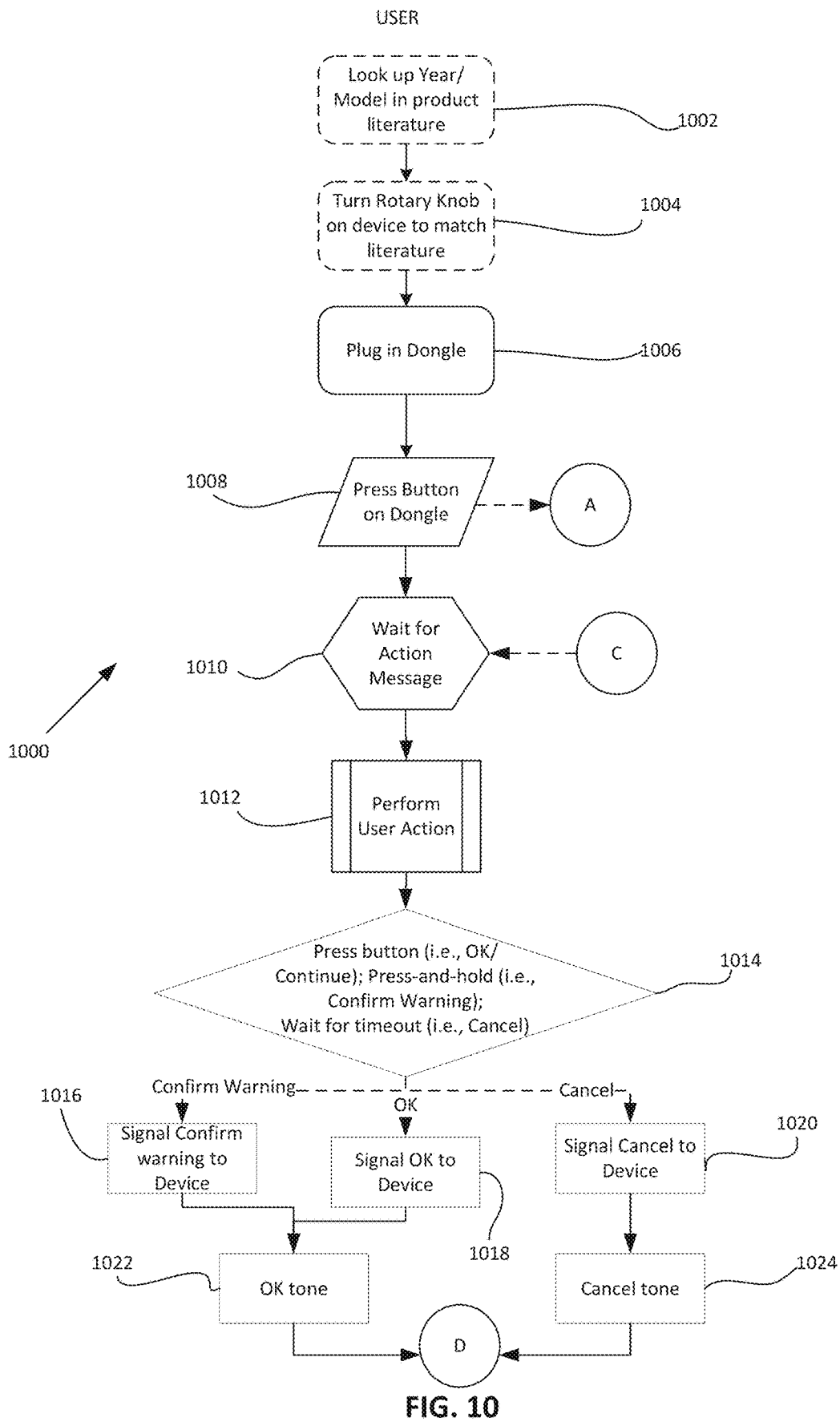
Figure 11:
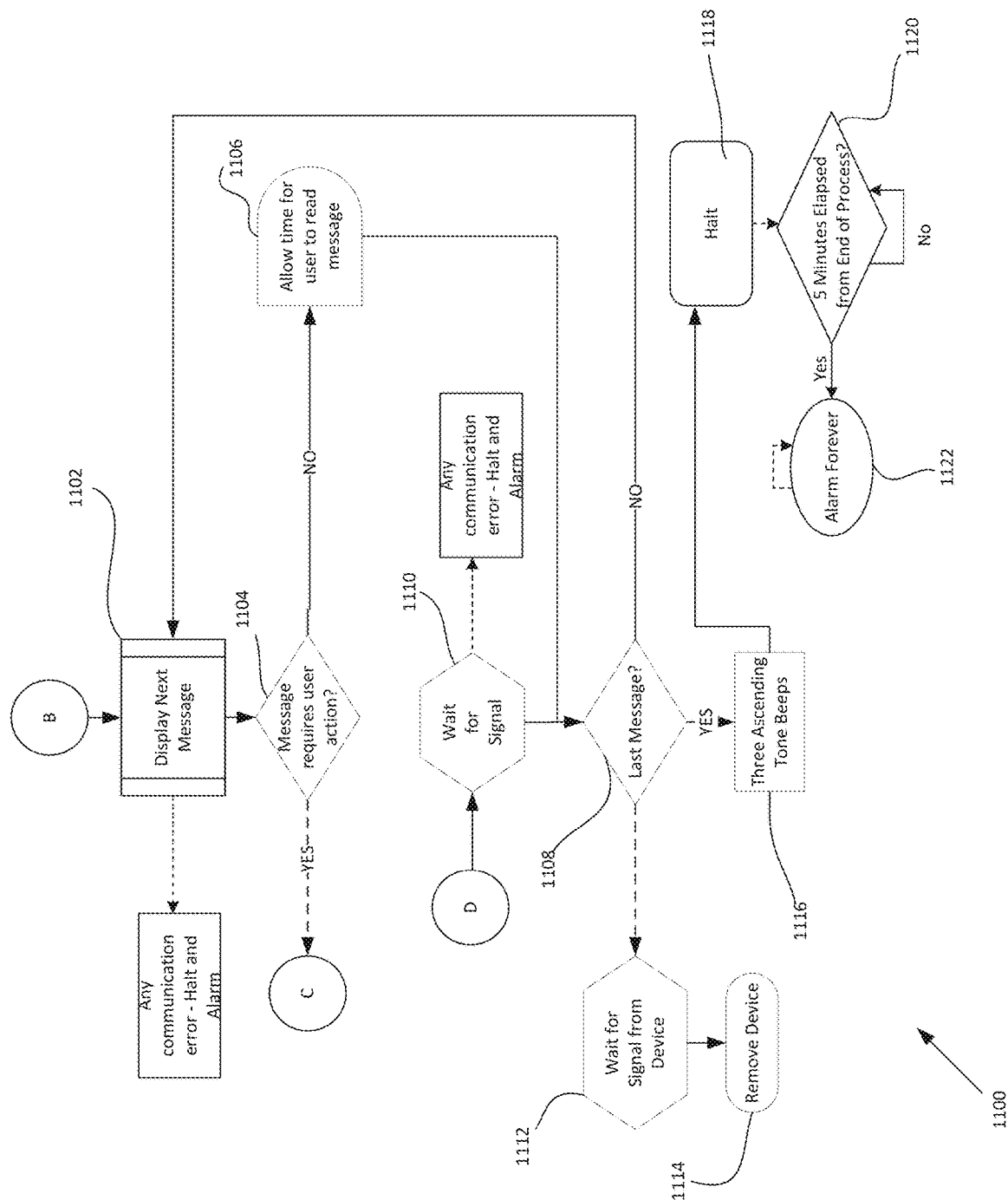

With reference now to FIGS. 9-11 a set of flowcharts illustrating another embodiment of a process for programming a vehicle key by an OBD programming dongle according to the present invention are provided. User actions are shown in the process 1000 and dongle 200 performed actions are shown in processes 900 and 1100. In one optional manner as shown with hatched lines 1002-1004, prior to powering on the vehicle, at 1002 the user determines the setting for the rotary switch 250 and sets the switch to the proper position at 1004 if this step is required. If the communications mode, communications protocol, bus type, and/or set of commands and responses are to be automatically determined by the dongle 200, the steps 1002 and 1004 may not be required as this may be automatically determined. At 1006, the dongle 200 is inserted by the user into a vehicle OBD interface 122 and powers on at 902. The user may then be required to put the vehicle key 110 into the vehicle ignition 128 and turns on the vehicle 120. At 1008 the user presses a button or switch 240 on the dongle 200. If the dongle 200 enters an error state during any step in the process or a communication error occurs, the process halts and an error alarm is sounded. After pressing the button 240 at step 1008, the user waits for a message from the dongle 200 at step 1010.

If the button 240 has been pressed at 904, the dongle 200 reads the state of the switch 250 at 906, however, if the type selected is incorrect, an error signal is provided at 908. If the communications protocol selected by the user and read at 906 is correct, the vehicle 120 VIN code is read at 910. Alternatively, the dongle 200 may automatically determine at 907 the communications mode, communications protocol, the set of commands and responses, and/or bus type to be used in to communicate with the vehicle. The automatic determination in step 907 may be used instead of or in addition to the user selection by the rotary switch 250 or other user input 251. If the communications protocol selected by the user and read at 906, or the communications mode automatically determined by the dongle in step 907, is correct, the vehicle 120 VIN code is read at 910. If a VIN has not been stored 922 in memory 214 previously, the VIN read at 910 is stored at 916. If the VIN does not match a VIN previously stored in the memory of the dongle 200, a continuous alarm sounds at 912. If the VIN matches a stored VIN at 924 the process continues. At 918 the dongle 200 reads a BCM number from the vehicle. After the BCM number has been read at 918, at 920 the dongle 200 determines one or more PINs based on the BCM number. This PIN may be 4 digits, 20 characters, or other format dependent on the vehicle's year make and model. Many other key pairing devices require the user to manually enter this PIN into the device. The dongle 200 handles all PIN data automatically without user interaction for increased reliability, accuracy, and repeatability of key programming. The process continues at B shown in the process 1100 in FIG. 11.

After the PINs have been determined at 920, the dongle 200 displays any further messages to the user at 1102. At 1104, if the message requires user action or response, a message is displayed to the user at 1010. The user may perform one of a set of user actions at 1012 based on the desired result. At 1014 the user performs the desired action, which is one of: confirm warning, which is performed by a press-and-hold action on the button 240; ok/continue, which is performed by pressing the button 240; and cancel, which is performed by taking no action or waiting for a timeout period to expire. For example, if the message "Warning: All keys will be erased. Are you sure? Press and hold to continue within 5 . . . 4 . . . 3 . . . 2 . . . 1" may be displayed by the dongle 200 on the display 270. In this context, a press-and-hold action by the user would accept the warning and continue; no action by the user would cancel and begin the termination of the pairing sequence. If the user confirms a warning, at 1016 a signal confirming the warning message is processed by the dongle 200, and an "OK" tone is signaled by the dongle at 1022. If the user chooses ok/continue, at 1018 an "OK" signal is processed by the dongle 200 and at 1022 an "OK" tone is signaled by the dongle 200. If the user chooses to cancel an action, a cancel signal is processed by the dongle 200 at 1020 and a cancel tone is signaled by the dongle at 1024. The "OK" tone and cancel tones, as well as any other tones produced by the dongle 200, signaled by the dongle 200 may be tones of different pitch, a series of tones, or a combination of tone pitch and length changes.

If the message at 1104 does require a user action, at 1110 the dongle 200 waits for the user input action and corresponding signal from steps 1012-1020. If a message displayed at 1104 does not require user action, at 1106 the message is displayed for a long enough period of time for the user to read the message, e.g., 5-30 seconds. If the message displayed at 1104 is not the last message, at 1108 the process returns to 1102 to display the next message. If the message displayed at 1104 is the last message at 1108, the dongle may wait for a user input at 1112 before being removed at 1114, or at 1116 may play a series of tones, e.g., three ascending tone beeps, to indicate the process is complete at 1118. If, after the process has halted at 1118, five minutes have elapsed as determined at 1120, the dongle 200 will signal an alarm tone at 1122 until it is removed.

The following three examples use a dongle 200 with a screen 270, which may be an OLED screen or other suitable simple display. The following examples also implement automatic PIN calculation based on a read BCM number and use a user input such as the press to ok/confirm, press-and-hold to confirm a warning, and wait to cancel.

1) Pairing Procedure started but canceled when user decided not to continue and erase keys from vehicle:
 a. Per the user instructions provided with the dongle, user gets in car, locks doors, turns on hazard lights, and makes sure ignition is off;
 b. User turns dial to invalid type and plugs in dongle;
 c. "Invalid Type Selected" message displayed;
 d. "Turn dial to Valid Type" message displayed;
 e. User turns dial to Type 2, a valid type;
 f. "Type 2 selected. Press OK/Continue" message displayed;
 g. User presses OK/Continue button;
 h. Dongle reads BCM number and calculates PIN code;
 i. "Insert first key in programming slot then press OK/Continue" message displayed;
 j. User inserts first key in programming slot then presses OK/Continue;
 k. "Warning: Do not press brake pedal until prompted" message displayed;
 l. "Press Vehicle's Start/Stop button then press OK/Continue" message displayed;
 m. User presses vehicle's Start/Stop button;
 n. Vehicle ignition switches on;
 o. User presses OK/Continue button;
 p. "All keys will be erased" message displayed;
 q. "Are you sure? If sure, press and hold OK/Continue within 5 . . . 4 . . . 3 . . . 2 . . . 1 seconds" message displayed;
 r. No action, signaling cancel to device;
 s. "Sequence canceled" message displayed;
 t. "Remove key from programming slot, press Start/Stop button, then press OK/Continue." message displayed;
 u. User removes key from programming slot then presses vehicle's Start/Stop button;
 v. Vehicle ignition switches off;
 w. User presses OK/Continue button;
 x. "Please unplug dongle" message displayed;
 y. User unplugs dongle.

2) Pairing Procedure where user only pairs one key to vehicle:
 a. Per the user instructions provided with the dongle, user gets in car, locks doors, turns on hazard lights, and makes sure ignition is off;
 b. User plugs in dongle;
 c. "Type 2 selected. Press OK/Continue" message displayed;
 d. User presses OK/Continue button;
 e. Dongle reads BCM number and calculates PIN code;
 f. "Insert first key in programming slot then press OK/Continue" message displayed;
 g. User inserts first key in programming slot then presses OK/Continue;
 h. "Warning: Do not press brake pedal until prompted" message displayed;
 i. "Press Vehicle's Start/Stop button then press OK/Continue" message displayed;
 j. User presses vehicle's Start/Stop button;
 k. Ignition switches on;
 l. User presses OK/Continue button;
 m. "All keys will be erased" message displayed;
 n. "Continue? If sure, press and hold OK/Continue within 5 . . . 4 . . . 3 seconds" message displayed;
 o. User presses and holds OK/Continue button, signaling Confirm Warning to device;
 p. "Sequence started. Do NOT unplug dongle." message displayed;
 q. Device sends command to start pairing sequence along with calculated PIN code;
 r. "Starting Pairing Sequence" message displayed;
 s. "Press Vehicle's Start/Stop button then press OK/Continue" message displayed;
 t. User presses vehicle's Start/Stop button;
 u. Ignition switches off;
 v. User presses OK/Continue button;
 w. "After next step, security indicator should blink 5 times." message displayed;
 x. "Press Vehicle's Start/Stop button" message displayed;
 y. User presses vehicle's Start/Stop button;
 z. Ignition switches on, security indicator blinks 5 times;
 aa. "Did security indicator blink 5 times? For yes, press OK/Continue" message displayed;
 bb. User presses OK/Continue button;
 cc. "Press Vehicle's Start/Stop button then press OK/Continue" message displayed;
 dd. User presses vehicle's Start/Stop button;

ee. Ignition switches off;
ff. User presses OK/Continue button;
gg. "First Key paired" message displayed;
hh. "Pair another? If yes, press OK/Continue within 5 . . . 4 . . . 3 . . . 2 . . . 1 seconds" message displayed;
  ii. No action, signaling cancel to device;
  jj. "Only 1 key paired" message displayed;
  kk. "Verify first key in programming slot then press OK/Continue" message displayed;
  ll. User verifies first key in programming slot then presses OK/Continue;
  mm. "Press Vehicle's Start/Stop button then press OK/Continue" message displayed;
  nn. User presses vehicle's Start/Stop button;
  oo. Ignition switches on;
  pp. User presses OK/Continue button;
  qq. "Press Vehicle's Start/Stop button then press OK/Continue" message displayed;
  rr. User presses vehicle's Start/Stop button;
  ss. Ignition switches off;
  tt. User presses OK/Continue button;
  uu. "Depress brake pedal. Press Vehicle's Start/Stop button until engine starts, then press OK/Continue" message displayed;
  vv. User depresses brake pedal, presses vehicle's Start/Stop button;
  ww. Vehicle starts;
  xx. User presses OK/Continue button;
  yy. "Please unplug dongle" message displayed;
  zz. User unplugs dongle.
3) Pairing Procedure where dongle automatically determines communications mode, communications protocol, bus type, and/or set of commands and functions to be used in pairing a vehicle key with a vehicle:
  a. Per the user instructions provided with the dongle, user gets in car, locks doors, turns on hazard lights, and makes sure ignition is off;
  b. User plugs in dongle;
  c. Dongle automatically determines one or more of the communications mode, communications protocol, bus type, and/or set of commands and functions to be used in pairing the vehicle key with the vehicle;
  d. User presses OK/Continue button;
  e. Dongle reads BCM number and calculates PIN code;
  f. "Insert first key in programming slot then press OK/Continue" message displayed;
  g. User inserts first key in programming slot then presses OK/Continue;
  h. "Warning: Do not press brake pedal until prompted" message displayed;
  i. "Press Vehicle's Start/Stop button then press OK/Continue" message displayed;
  j. User presses vehicle's Start/Stop button;
  k. Ignition switches on;
  l. User presses OK/Continue button;
  m. "All keys will be erased" message displayed;
  n. "Continue? If sure, press and hold OK/Continue within 5 . . . 4 . . . 3 seconds" message displayed;
  o. User presses and holds OK/Continue button, signaling Confirm Warning to device;
  p. "Sequence started. Do NOT unplug dongle." message displayed;
  q. Device sends command to start pairing sequence along with calculated PIN code;
  r. "Starting Pairing Sequence" message displayed;
  s. "Press Vehicle's Start/Stop button then press OK/Continue" message displayed;
  t. User presses vehicle's Start/Stop button;
  u. Ignition switches off;
  v. User presses OK/Continue button;
  w. "After next step, security indicator should blink 5 times." message displayed;
  x. "Press Vehicle's Start/Stop button" message displayed;
  y. User presses vehicle's Start/Stop button;
  z. Ignition switches on, security indicator blinks 5 times;
  aa. "Did security indicator blink 5 times? For yes, press OK/Continue" message displayed;
  bb. User presses OK/Continue button;
  cc. "Press Vehicle's Start/Stop button then press OK/Continue" message displayed;
  dd. User presses vehicle's Start/Stop button;
  ee. Ignition switches off;
  ff. User presses OK/Continue button;
  gg. "First Key paired" message displayed;
  hh. "Pair another? If yes, press OK/Continue within 5 . . . 4 . . . 3 . . . 2 . . . 1 seconds" message displayed;
  ii. No action, signaling cancel to device;
  jj. "Only 1 key paired" message displayed;
  kk. "Verify first key in programming slot then press OK/Continue" message displayed;
  ll. User verifies first key in programming slot then presses OK/Continue;
  mm. "Press Vehicle's Start/Stop button then press OK/Continue" message displayed;
  nn. User presses vehicle's Start/Stop button;
  oo. Ignition switches on;
  pp. User presses OK/Continue button;
  qq. "Press Vehicle's Start/Stop button then press OK/Continue" message displayed;
  rr. User presses vehicle's Start/Stop button;
  ss. Ignition switches off;
  tt. User presses OK/Continue button;
  uu. "Depress brake pedal. Press Vehicle's Start/Stop button until engine starts, then press OK/Continue" message displayed;
  vv. User depresses brake pedal, presses vehicle's Start/Stop button;
  ww. Vehicle starts;
  xx. User presses OK/Continue button;
  yy. "Please unplug dongle" message displayed;
  zz. User unplugs dongle.

Figure 12:
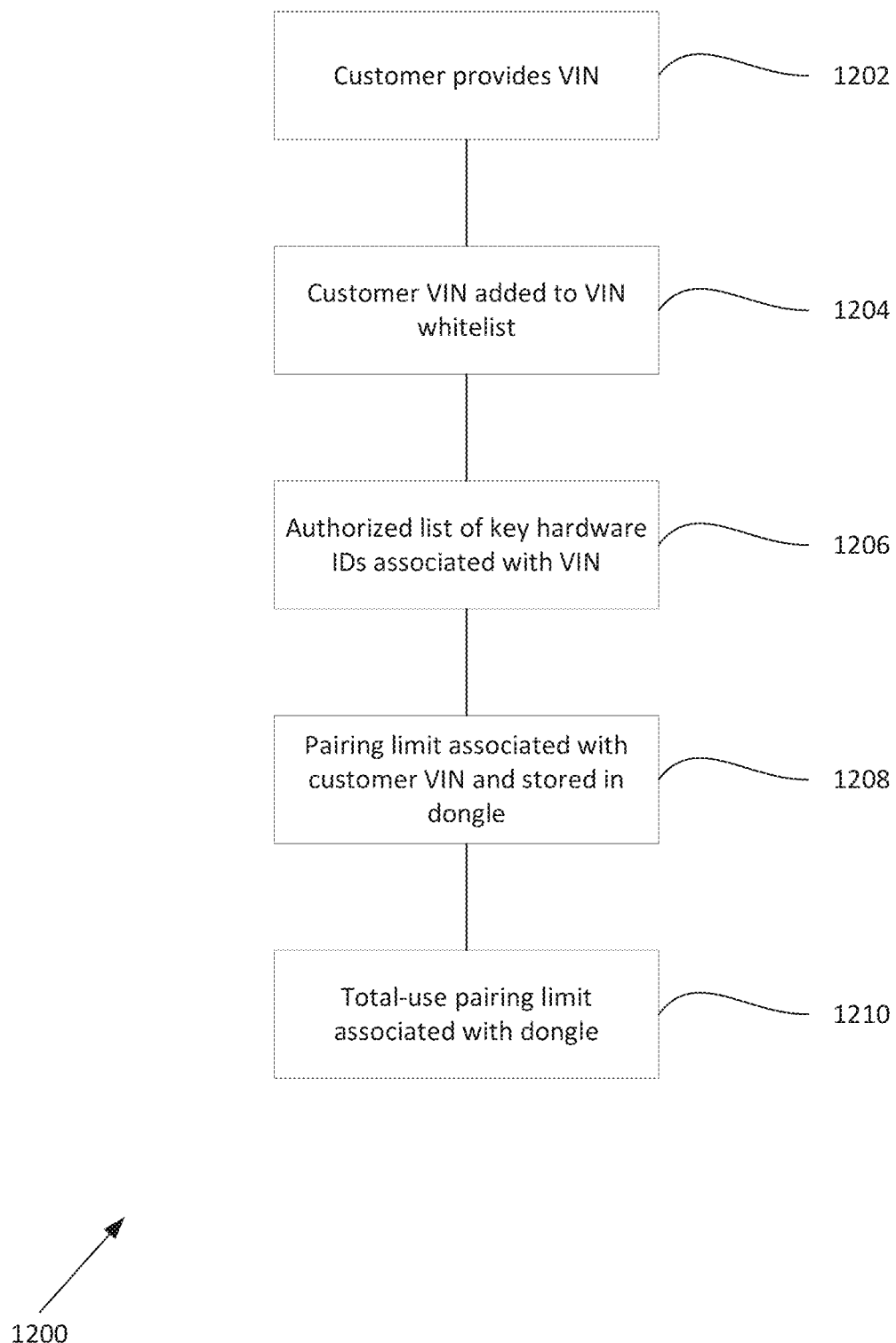
FIG. 12 provides a flowchart illustrating an embodiment of associating a VIN with a dongle according to the present invention.

With reference now to FIG. 12, a flowchart 1200 representing a system and method for associating a VIN with an OBD programming dongle for use with pairing a programmable vehicle key with a vehicle associated with the VIN is provided. The process shown in the flowchart 1200 provides an explicit whitelist of VINs and/or keys allowed to be paired by a particular dongle. At step 1202, when the dongle is manufactured at a factory, or when the dongle is purchased by a user, the VIN associated with the user's vehicle is provided by the user. At step 1204, the VIN of the vehicle that has been provided by the user is programmed into or stored in the dongle. This adds the customer provided VIN to a whitelist of authorized VINs with which the dongle may be used to pair a key. The customer may provide additional VINs to be added to the whitelist at the time of purchase or at a later time. At step 1206, a whitelist of authorized vehicle key hardware IDs (including all hardware IDs) may be created and programmed or stored into the dongle. The list of authorized vehicle key hardware IDs is used to limit the use of the dongle such that only specific vehicle keys, whose hardware IDs are included in the explicit whitelist, may be allowed to be paired using that specific dongle. At step 1208, a single-VIN pairing limit is set within the dongle. The single-VIN pairing limit is a numerical value that limits or determines the number of times the dongle may be used to pair an authorized key or keys with a single vehicle or VIN. At step 1210, a total-use pairing limit may be created and set within the dongle. The total-use pairing limit determines the total number of times the dongle may be used to pair vehicle keys (e.g., authorized vehicle keys as determined by whitelisted vehicle key hardware ID) to any authorized vehicle or VIN on a whitelist.

Figure 13:
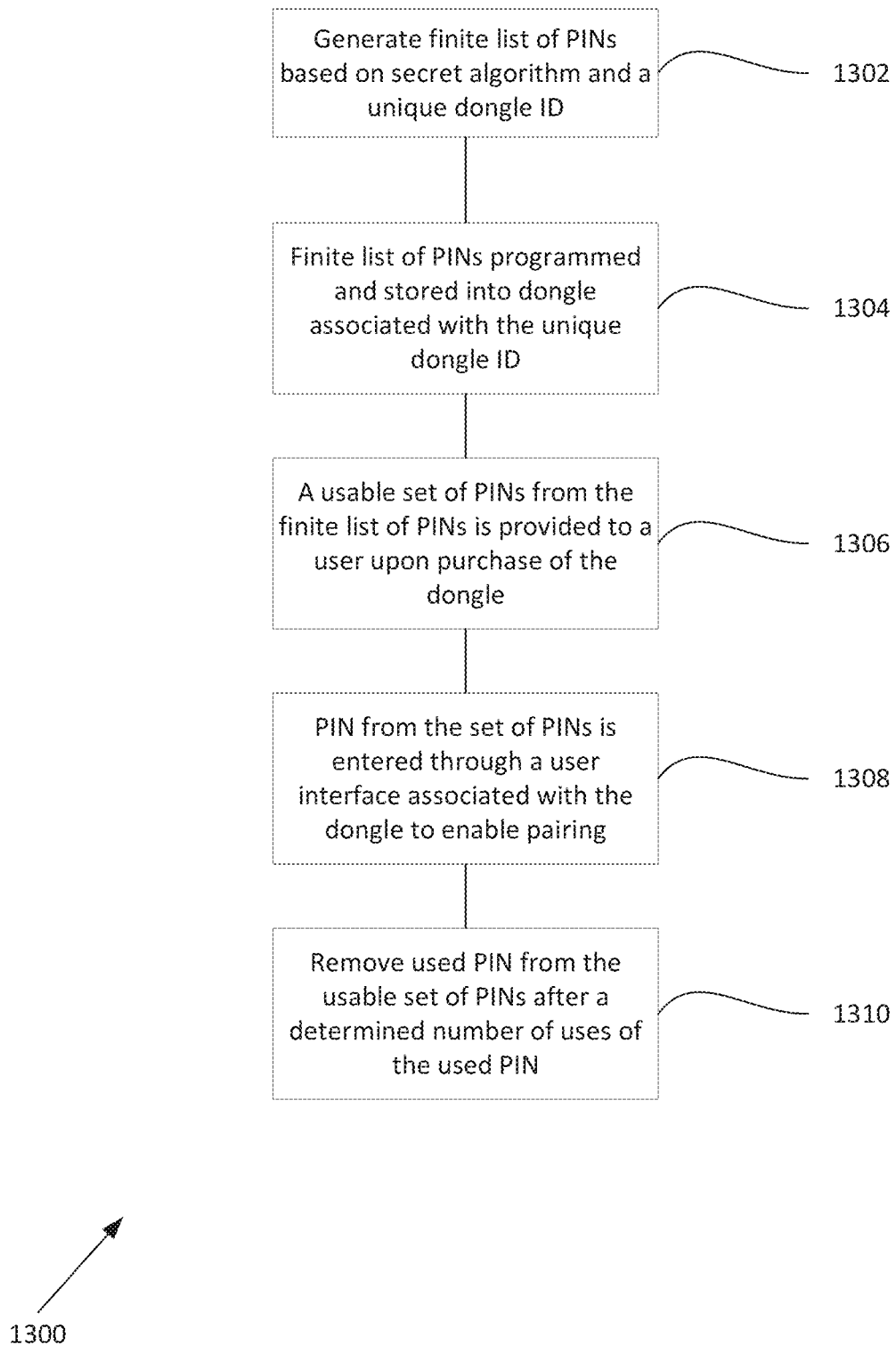
FIG. 13 provides a flowchart illustrating an embodiment of associating a set of PINs with a dongle according to the present invention.

With reference now to FIG. 13, a flowchart 1300 representing a system and method for using an activation PIN to enable pairing of a vehicle key with a vehicle by a dongle is provided. At step 1302, at the time the dongle is manufactured at a factory a finite list of usable PINs is generated and at step 1304 is programmed or stored in the dongle. The finite list of usable PINs is generated by based in part on a predetermined algorithm and a unique hardware ID stored on and associated with the specific dongle. At step 1306, when the dongle is purchased by a user or otherwise is activated, a valid set of PINs, which may be a single valid PIN, from the finite list of usable PINs is provided to the user. At step 1308, the user enters a PIN from the valid set of PINs via a user interface associated with the dongle. The user interface may be part of the dongle, for example a set of buttons and a display or a touch display, or may be another device, such as a smart phone or computer, associated with and in communication with the dongle by a wired or wireless connection. Upon entry of the PIN from the valid set of PINs, pairing of a vehicle key with a vehicle by the dongle is enabled and the pairing process may begin. At step 1310, the PIN used and input by the user is removed from the valid set of PINs after a predetermined number of uses of the used PIN. This number may be one, for a single use dongle, or may be a larger predetermined number.

Figure 4:
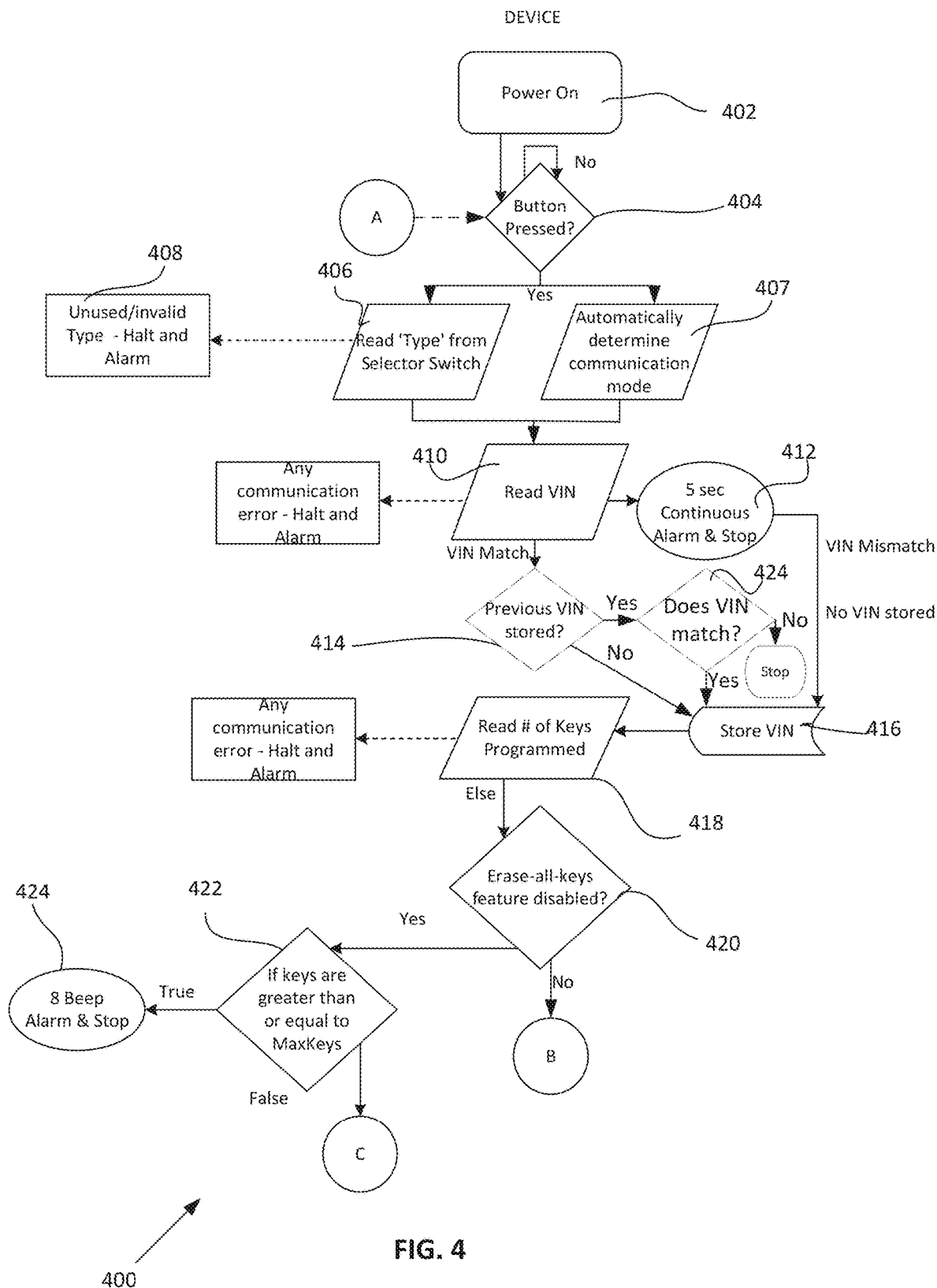
FIGS. 4-8 provide a set of flowcharts illustrating another embodiment of a process for programming a vehicle key by a dongle according to the present invention.
Figure 5:
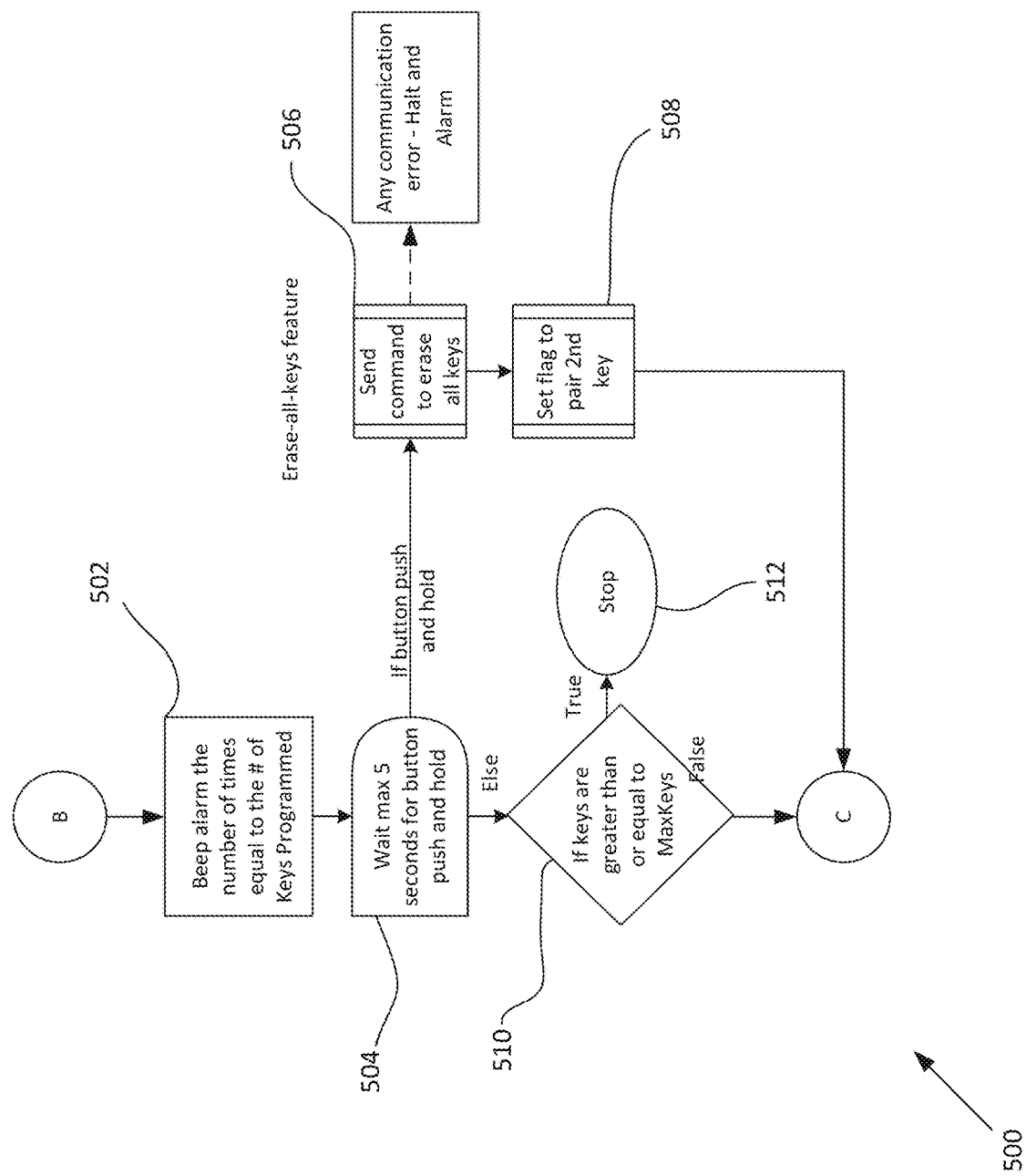
Figure 6:
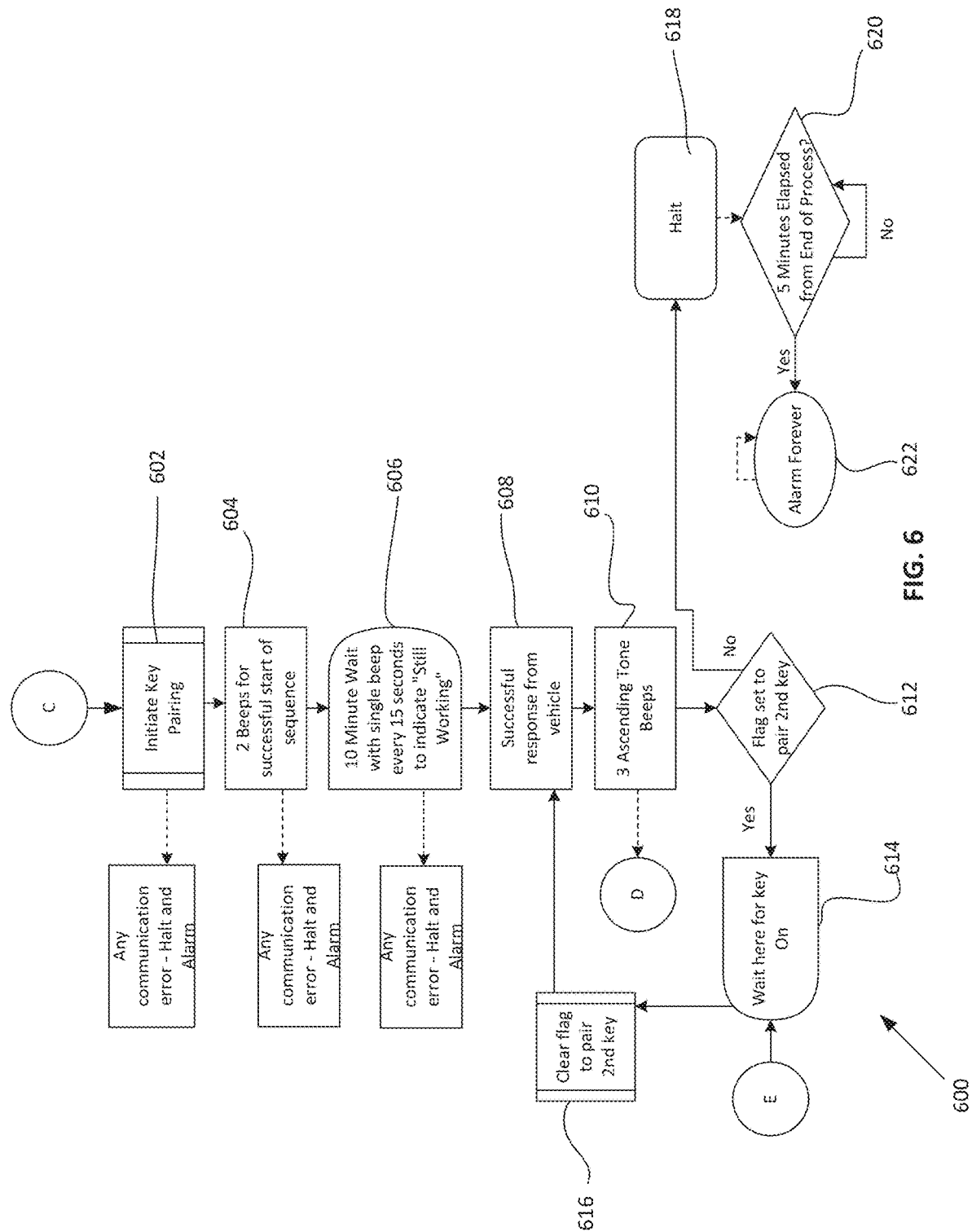
Figure 7:
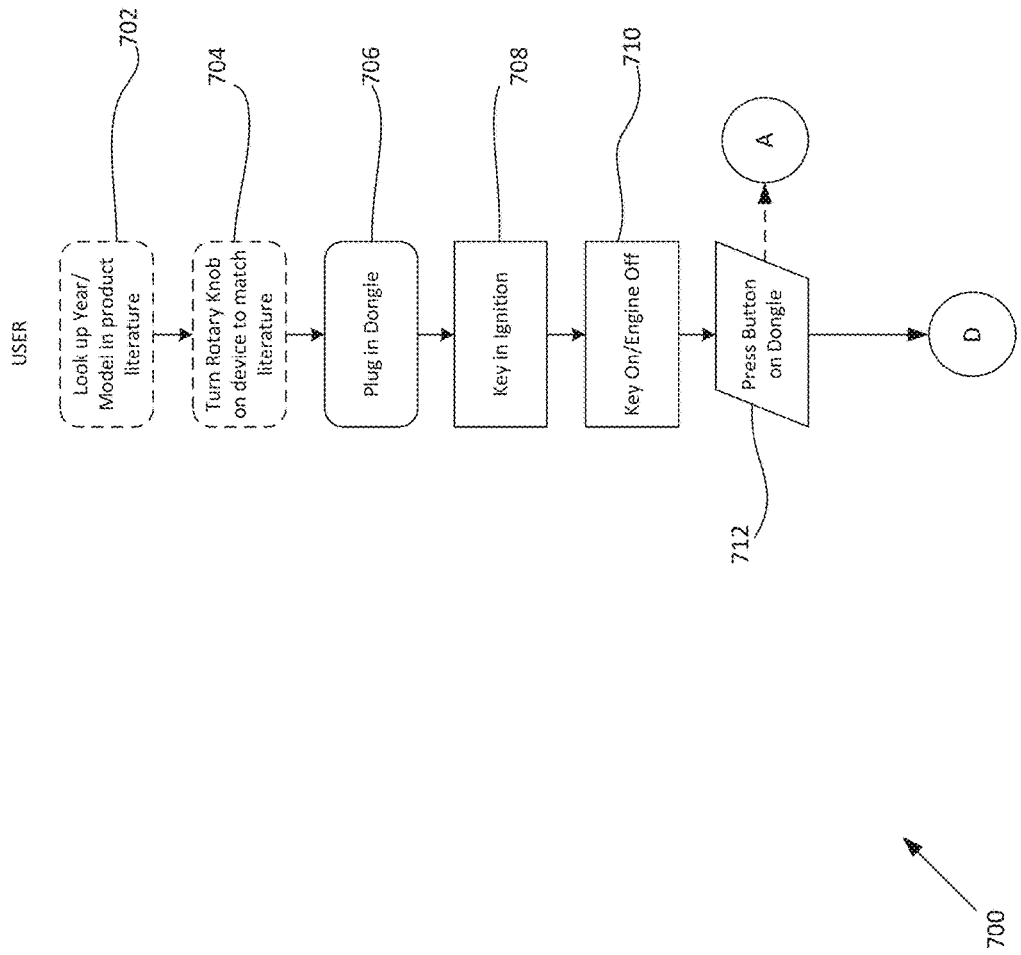
Figure 8:
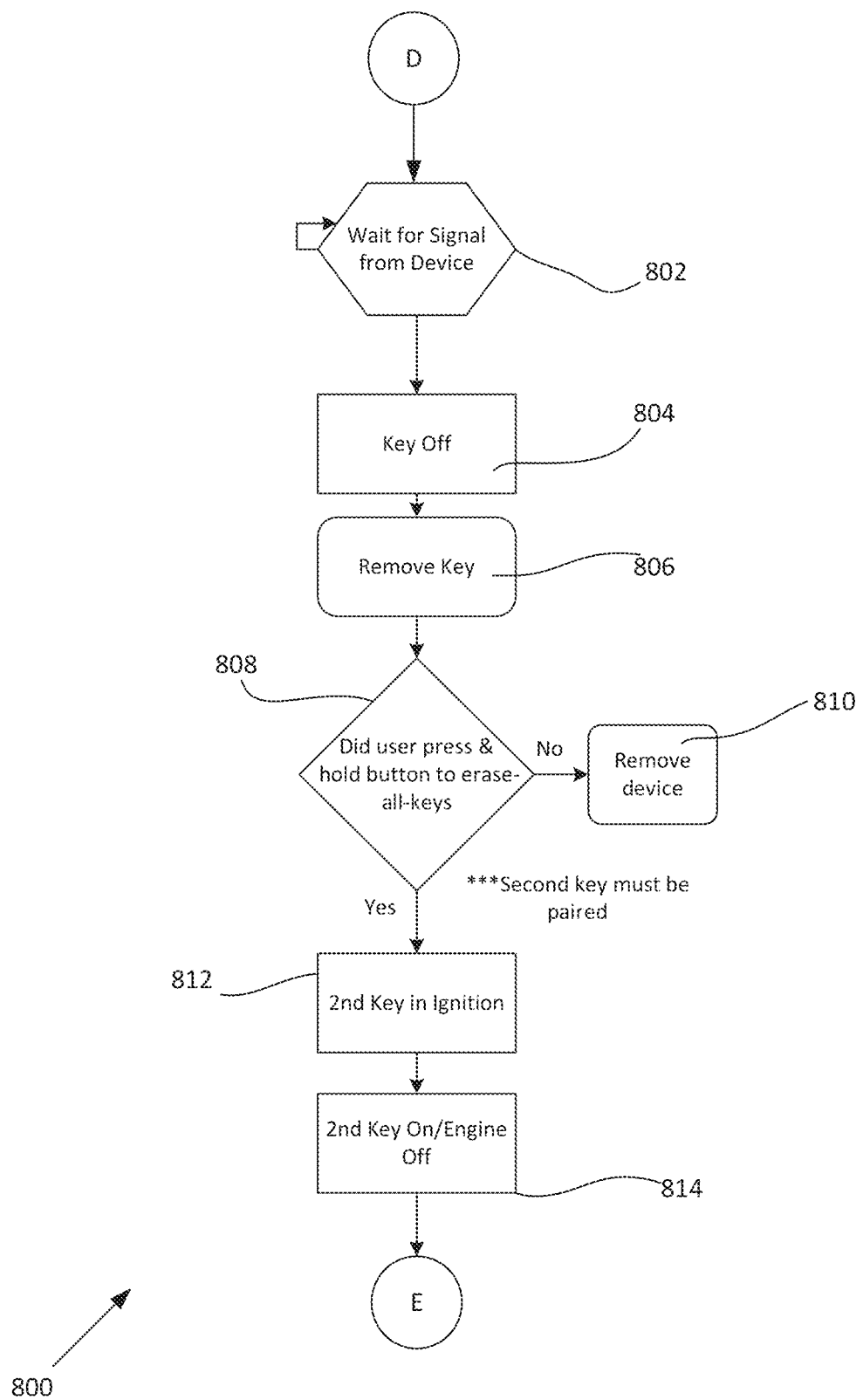
Figure 14:
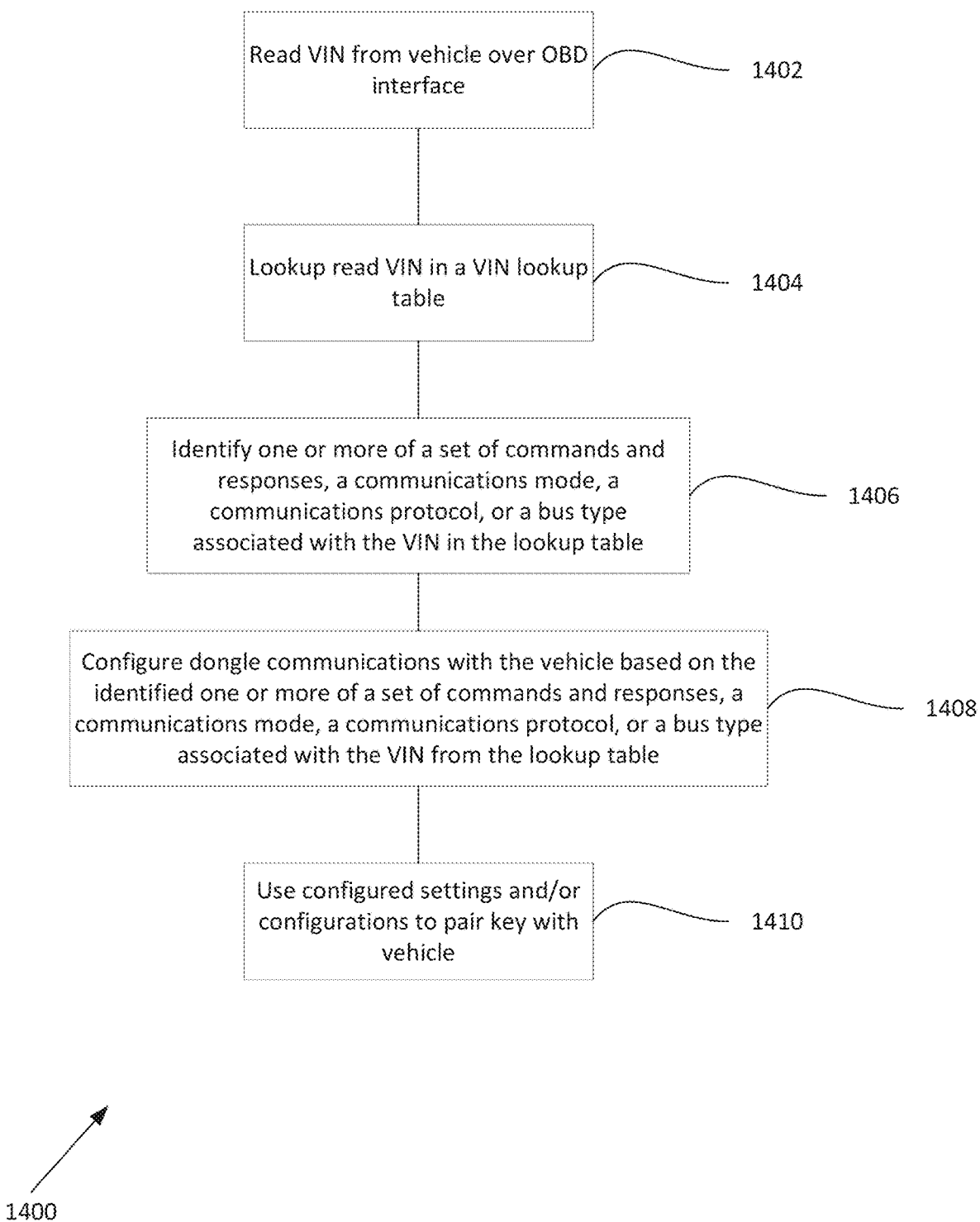
FIGS. 14-16 provide a series of flowcharts illustrating processes for automatically identifying one or more of a communications mode, communications protocol, bus type, and/or set of commands and responses to be used in paring a key with a vehicle using a dongle according to an embodiment of the present invention.
Figure 15:
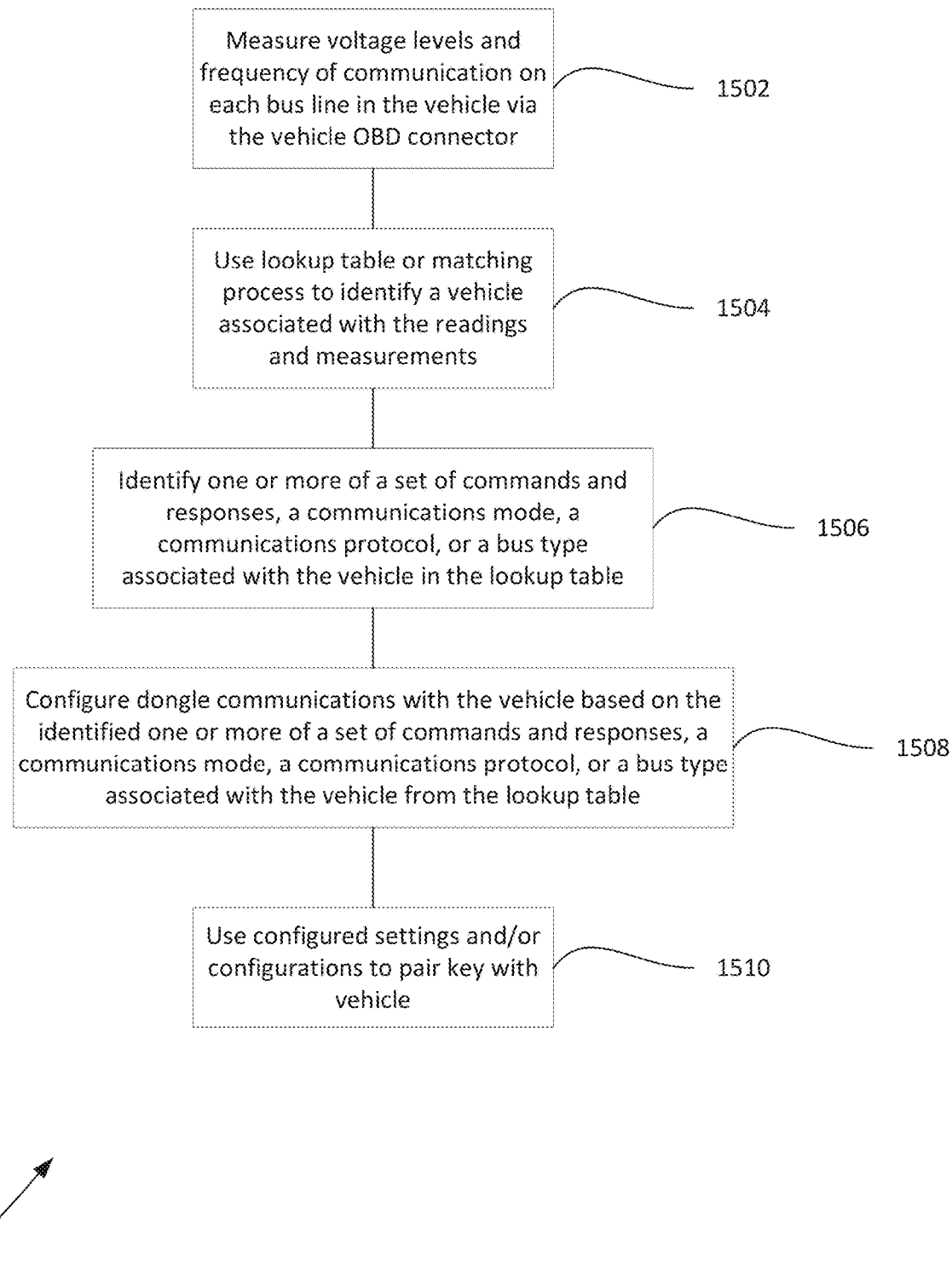
Figure 16:
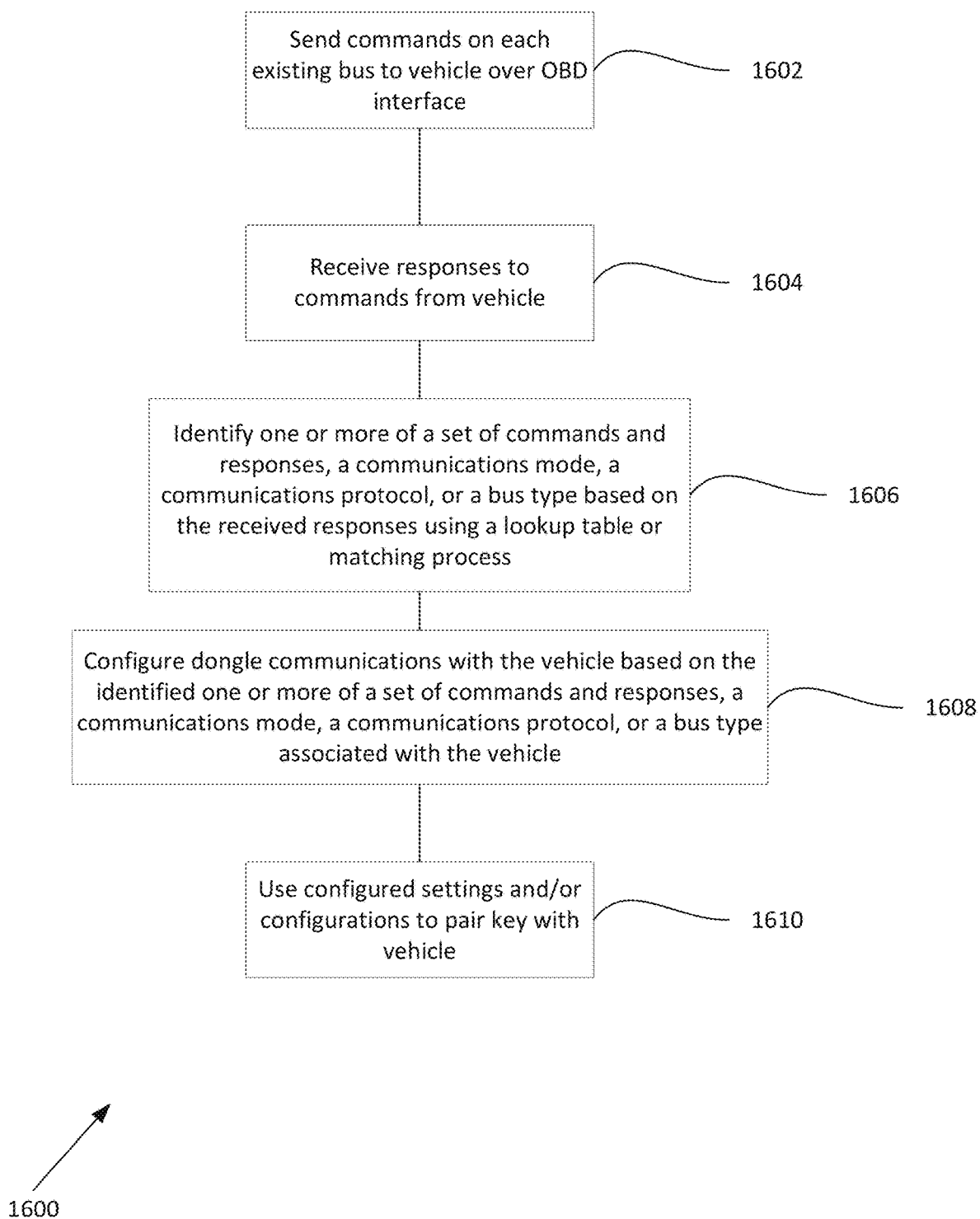

With reference now to FIGS. 14-16, a series of flowcharts illustrating processes for automatically identifying one or more of a communications mode, communications protocol, bus type, and/or set of commands and responses to be used in paring a key with a vehicle using a dongle are provided. The processes shown in the flowcharts 1400, 1500, and 1600 may be used in any of, for example, the steps 304A shown in FIG. 3, 407 shown in FIG. 4, or 907 shown in FIG. 9, or in a similar automatic process of identifying one or more of a communications mode, communications protocol, bus type, and/or set of commands and responses to be used in paring a key with a vehicle using a dongle such as the dongle 200. Specifically, the processes shown in the flowcharts 1400, 1500, and 1600 may be one or more sets of code, logic, or instructions stored in the memory 214 and executed by the processor 212 to configure to dongle 200 to perform a key pairing process with a vehicle over an OBD interface.

FIG. 14 provides a process 1400 for automatically identifying one or more of a communications mode, communications protocol, bus type, and/or set of commands and responses to be used in paring a key with a vehicle using a dongle 200. In step 1402 a VIN is read by the dongle from the vehicle to which the dongle is connected over an OBD interface. In step 1404 the read VIN is looked up in a lookup table or matched using a matching process. In step 1406 the dongle uses the VIN to identify one or more of a set of commands and responses, a communications mode, a communications protocol, or a bus type associated with the VIN in the lookup table. In step 1408, the dongle uses the information from step 1406 to configure dongle communications with the vehicle based on the identified one or more of a set of commands and responses, a communications mode, a communications protocol, or a bus type associated with the VIN from the lookup table. In step 1410 the dongle uses the configured settings and/or configurations to communicate with the vehicle to perform a key pairing process.

FIG. 15 provides a process 1500 for automatically identifying one or more of a communications mode, communications protocol, bus type, and/or set of commands and responses to be used in paring a key with a vehicle using a dongle 200. In step 1502 the dongle measures voltage levels and frequency of communication on each bus line in the vehicle via the vehicle OBD connector. In step 1504 the dongle uses a lookup table or a matching process to identify a vehicle or entry associated with the readings and measurements from step 1502. In step 1506 the dongle uses the readings and measurements and/or the identified vehicle or entry to identify one or more of a set of commands and responses, a communications mode, a communications protocol, or a bus type associated with the vehicle or entry in the lookup table. In step 1508, the dongle uses the information from step 1506 to configure dongle communications with the vehicle based on the identified one or more of a set of commands and responses, a communications mode, a communications protocol, or a bus type associated with the vehicle from the lookup table. In step 1510 the dongle uses the configured settings and/or configurations to communicate with the vehicle to perform a key pairing process.

FIG. 16 provides a process 1600 for automatically identifying one or more of a communications mode, communications protocol, bus type, and/or set of commands and responses to be used in paring a key with a vehicle using a dongle 200. In step 1602 the dongle sends commands on each existing or present bus interface to the vehicle over the OBD interface. In step 1604 the dongle receives a set of responses from the vehicle based on the commands sent from step 1602. In step 1606 the dongle uses the received responses to identify one or more of a set of commands and responses, a communications mode, a communications protocol, or a bus type associated with the received responses in a lookup table or using a matching process. In step 1608, the dongle uses the information from step 1606 to configure dongle communications with the vehicle based on the identified one or more of a set of commands and responses, a communications mode, a communications protocol, or a bus type associated with the vehicle. In step 1610 the dongle uses the configured settings and/or configurations to communicate with the vehicle to perform a key pairing process.

While the invention has been described by reference to certain preferred embodiments, it should be understood that numerous changes could be made within the spirit and scope of the inventive concept described. Also, the present invention is not to be limited in scope by the specific embodiments described herein. It is fully contemplated that other various embodiments of and modifications to the present invention, in addition to those described herein, will become apparent to those of ordinary skill in the art from the foregoing description and accompanying drawings. Thus, such other embodiments and modifications are intended to fall within the scope of the following appended claims. Further, although the present invention has been described herein in the context of particular embodiments and implementations and applications and in particular environments, those of ordinary skill in the art will appreciate that its usefulness is not limited thereto and that the present invention can be beneficially applied in any number of ways and environments for any number of purposes. Accordingly, the claims set forth below should be construed in view of the full breadth and spirit of the present invention as disclosed herein.

What is claimed is:

1. A dongle adapted to pair an unpaired vehicle key with a vehicle, the dongle comprising:
   a button;
   an audible signal generator;
   a processor; and
   a memory comprising a set of executable code when executed by the processor configured to:
   initiate, by user actuation of the button on the dongle, a key pairing process, the key pairing process comprising:
      initiating communications between the dongle and the vehicle via the vehicle communications port using a determined communications mode;
      identifying, by the dongle, a number of existing keys already paired with the vehicle;
      automatically pairing, by the dongle, the unpaired vehicle key with the vehicle; and
      verifying that the automatic pairing of the vehicle key from the set of vehicle keys with the vehicle was successful.

2. The dongle of claim 1, wherein the determined communications mode is a communications mode automatically determined by the dongle to be used in the key pairing process.

3. The dongle of claim 2, wherein the communications mode comprises one or more of a communications protocol, a bus type, or a set of commands and responses.

4. The dongle of claim 2, wherein the automatic determination is based on a VIN read from the vehicle over an OBD interface.

5. The dongle of claim 2, wherein the automatic determination is based on a measurement of voltage levels and communications frequency over a set of bus lines of the vehicle over an OBD interface.

6. The dongle of claim 2, wherein the automatic determination is based on sending a set of commands by the dongle and receiving a set of responses from the vehicle over an OBD interface.

7. The dongle of claim 1, wherein the key pairing process further comprises:
   determining that the determined communications mode is not compatible with the vehicle; and
   terminating the key pairing process.

8. The dongle of claim 1, wherein the key pairing process further comprises:
   reading, by the dongle, a VIN from the vehicle;
   determining that the VIN read from the vehicle matches a stored VIN in the dongle; and
   continuing the key pairing process.

9. The dongle of claim 1, wherein the key pairing process further comprises:
   reading, by the dongle, a VIN from the vehicle;
   determining that the VIN read from the vehicle does not match a stored VIN in the dongle; and
   terminating the key pairing process.

10. The dongle of claim 1, wherein the key pairing process further comprises:
    determining that the identified number of existing keys exceeds a predetermined threshold; and
    terminating the key pairing process.

11. The dongle of claim 1, wherein the dongle is configured to become inoperable after the key pairing process is performed a predetermined number of times.

12. The dongle of claim 1, wherein the key pairing process further comprises:
    receiving an additional actuation of the button on the dongle; and
    unpairing a set of all paired vehicle keys from the vehicle.

13. The dongle of claim 1, wherein the dongle further comprises a rotating switch, the rotating switch providing for navigating and selecting settings or configurations for the dongle.

14. A method of pairing an unpaired vehicle key to a vehicle by a dongle, the method comprising:
    initiating, by user actuation of a button on the dongle, a key pairing process, the key pairing process comprising:
       initiating communications between the dongle and the vehicle by a communications mode;
       reading, by the dongle, a VIN from the vehicle;
       comparing, by the dongle, the VIN read from the vehicle with a set of VINs stored on the dongle;
       determining, by the dongle, that the VIN read from the vehicle matches a VIN from the set of VINs; and
       automatically pairing, by the dongle, the unpaired vehicle key with the vehicle.

15. The method of claim 14, wherein the method further comprises automatically determining the communications mode by the dongle.

16. The method of claim 15, wherein the method further comprises automatically determining by the dongle one or more of a communications protocol, a bus type, or a set of commands and functions to be used in communicating with the vehicle in the key pairing process.

17. The method of claim 15, wherein the automatic determination is based on the VIN read from the vehicle over an OBD interface.

18. The method of claim 15, wherein the automatic determination is based on measuring voltage levels and communications frequency over a set of bus lines of the vehicle over an OBD interface.

19. The method of claim 15, wherein the automatic determination is based on sending a set of commands by the dongle and receiving a set of responses from the vehicle over an OBD interface.

20. The method of claim 14, wherein the method further comprises:
    determining, by the dongle, that the VIN read from the vehicle does not match a VIN from the set of VINs; and
    terminating the key pairing process.

21. The method of claim 14, wherein the method further comprises:
    terminating the key pairing process based upon determining, by the dongle, that the key pairing process has been initiated and completed a number of times exceeding a predetermined threshold.

22. The method of claim 14, wherein the method further comprises:
    determining a number of times the key pairing process has been initiated for the VIN read from the vehicle; and
    upon determining that the determined number of times the key pairing process has been initiated for the VIN read from the vehicle has exceeded a predetermined limit, terminating the key pairing process.

* * * * *